United States Patent [19]
Nishikawa et al.

[11] Patent Number: 5,737,217
[45] Date of Patent: Apr. 7, 1998

[54] SYSTEM FOR DETECTING AND CONTROLLING THE POSITION OF A MOBILE ROBOT

[75] Inventors: Masao Nishikawa; Nobuaki Ozawa, both of Saitama, Japan

[73] Assignee: Honda Giken Kogyo Kabushiki Kaisha, Tokyo, Japan

[21] Appl. No.: 363,497

[22] Filed: Dec. 23, 1994

[30] Foreign Application Priority Data

Dec. 30, 1993 [JP] Japan .................. 5-351150

[51] Int. Cl.⁶ .................. B25J 11/00; G05B 19/00
[52] U.S. Cl. .................. 364/167.01; 180/8.6; 318/568.12; 318/568.16; 395/93
[58] Field of Search .................. 364/167.01, 424.02, 364/424.01; 395/80, 90, 93, 94; 901/1, 9, 46, 47; 318/568.12, 568.16, 568.11; 180/8.1, 8.6, 8.2

[56] References Cited

U.S. PATENT DOCUMENTS

| | | | |
|---|---|---|---|
| 4,703,240 | 10/1987 | Yoshimoto | 318/587 |
| 4,811,229 | 3/1989 | Wilson | 364/424.02 |
| 5,378,969 | 1/1995 | Haikawa | 318/568.12 |
| 5,402,050 | 3/1995 | Ozawa | 318/568.12 |
| 5,416,393 | 5/1995 | Gomi et al. | 318/568.12 |
| 5,421,426 | 6/1995 | De Beaucourt et al. | 180/8.1 |

FOREIGN PATENT DOCUMENTS

| | | | |
|---|---|---|---|
| 0195191 | 9/1986 | European Pat. Off. | G05D 1/02 |
| 0406018 | 1/1991 | European Pat. Off. | B62D 57/032 |
| 0488693 | 6/1992 | European Pat. Off. | B62D 57/032 |
| 2504112 | 8/1975 | Germany | G05D 1/03 |
| 3129800 | 2/1983 | Germany | G05D 1/03 |
| 55-97609 | 7/1980 | Japan | G05D 1/03 |
| 59-32009 | 2/1984 | Japan | G05D 1/03 |
| 59-121506 | 7/1984 | Japan | G05D 1/03 |
| 3-184782 | 8/1991 | Japan | B25J 5/00 |
| 6-63876 | 3/1994 | Japan | B25J 5/00 |
| 2089615 | 6/1982 | United Kingdom | G05D 1/03 |

OTHER PUBLICATIONS

Abstract of AU-A-5 562 280 (D.J. Erskine) Aug. 1981.
Abstract of JP4101791, vol. 16, No. 339 (Mitsubishi) Apr. 1992.

*Primary Examiner*—Reba I. Elmore
*Assistant Examiner*—Steven R. Garland
*Attorney, Agent, or Firm*—Lyon & Lyon LLP

[57] ABSTRACT

A system for controlling locomotion of a legged mobile robot walking in a working space. The system is provided with optical detects which are disposed in a line array at the both sides of a foot member of the robot. On the other hand, a landmark is provided in the working space. The landmark comprises of a line or an arc which divides the space into two regions with different attributes, i.e. different in brightness. The optical detectors generate different signals depending on the brightness. With the generated signals, a relative position of the robot to the landmark is detected. Moreover, when the landmark is an arc, its center is located in line with a work for the robot, a relative direction of the robot to the landmark or the work is detected. Based on the detection, locomotion of the robot is controlled in such a manner that the robot can stably ascend/descent stairs or spiral staircases.

28 Claims, 29 Drawing Sheets

Foot width W=200mm   22R(L)   382   80

Inside error  
Ein= 0 mm

Outside error  
Eout= +10mm

Fore-and-aft error Xerr   $= ( \text{Eout} + \text{Ein} ) / 2 = 5$ [mm]

Angular error $\theta$err   $= \tan^{-1}\{ ( \text{Eout} - \text{Ein} ) / W \}$ $= \tan^{-1}\{ ( 10 - 0 ) / 200 \}$ $= 2.86$ [deg]

FIG. 10
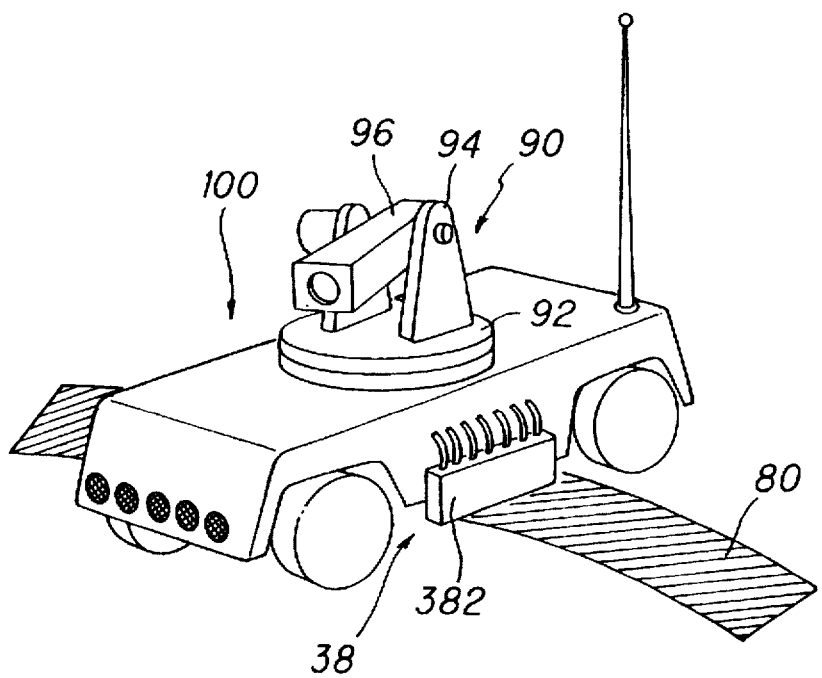
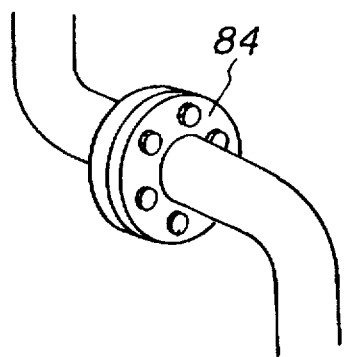

$K(z) = k$ $I(z) = \dfrac{z}{z-1}$ $G(z) = g$ $U_n = P_n - P_{n-1} + k \cdot e_{n-1}$
$\phantom{U_n} = L + k \cdot e_{n-1}$ Load distribution.
Darker regions indicate greater load.
The white region indicates loads at or below the threshold value.

So long as the optical detector array is over the step, the relative position can be detected irrespective of how small the distributed load.

SYSTEM FOR DETECTING AND CONTROLLING THE POSITION OF A MOBILE ROBOT

BACKGROUND OF THE INVENTION

1. Field of the Invention

This invention relates to a system for detecting and controlling positions of a mobile robot. More particularly, the invention relates to a system for detecting and controlling positions of a mobile robot, which can easily detect relative position and orientation within the workspace of the mobile robot. The invention also relates to a control system enabling a legged mobile robot to move stably and rapidly on stairs and in other such environments which restrict footfall position.

2. Description of the Prior Art

Mobile robots have been proposed in various forms including the wheeled, crawler and legged types. When such a robot carries out a task with respect to an object within its workspace (the work), it is required to orient itself with respect to the work for conducting the task. A mobile robot is, however, influenced by a number of unpredictable factors such as error in the measurement of its own position and slippage between the locomotion means and the ground surface occurring during movement. It is therefore not certain whether the robot will be properly oriented relative to the work when it completes its locomotion. When the mobile robot reaches its destination, therefore, it has to be able to ascertain its position and orientation relative to the work with high precision.

Ideally, the mobile robot would be able to continuously track its position relative to the work as it approaches the work. Since this would involve the processing of huge volumes of data, however, it is not practicable with currently available technology. For overcoming this problem, Japanese Laid-open Patent Application Nos. 59(1984)-32,009, 59(1984)-121,506 and 55(1980)-97,609 etc. teach methods for reducing the amount of processed data by laying auxiliary guide means (such as tape) along the locomotion paths within the robot operating space. The provision of buried electromagnetic induction wires has also been proposed.

These techniques are troublesome owing to the need to equip the workspace with special devices and, particularly in the case of subsurface wires, are quite costly to implement. In some environments, moreover, such as at a nuclear power facility, large-scale changes in the environment are not allowed.

Techniques have also been developed for enabling a mobile robot to discern its position and orientation relative to a work by pattern matching with camera images or other such visual information stored in memory beforehand. For reducing the amount of data that has to be processed, these methods generally use window processing to reduce search time. When the mobile robot's task is to inspect a piece of machinery, for example, the time for completing the task can indeed be shortened by having the robot ascertain its position using images taken of the pressure gauges and the like that are to be inspected. Since the mobile robot first identifies its position using other features of the equipment or the architectural environment and then searches for the work to be inspected, however, its working speed is slow. Although working speed can be speeded up by increasing the performance of the onboard computer, it is better for economical reasons to use a low-performance computer. In addition, autonomous robots are by nature subject to weight and energy consumption restrictions.

The present invention was accomplished in light of the foregoing circumstances and has as one of its objects to provide a system for detecting a position of a mobile robot and controlling the same which enables a mobile working robot equipped with a relatively low-performance computer to use a minimal number of landmarks provided in the workspace for detecting whether or not it has properly reached the work, accurately and in real time.

Moreover, among the various types of mobile robots, some types, such as the legged mobile robot, have discrete ground contact (footfall) positions. When such a mobile robot moves through an environment that restricts footfall position, as when it ascends or descends stairs, the footfall position has to be carefully controlled. As will be understood from FIG. 33, if a legged mobile robot's footfall position is too far back relative to a step during stair climbing, the resulting decrease in the ground contact area destabilizes the robot's attitude. If the footfall position is too far ahead, on the other hand, the foot strikes against the step riser when it moves up to the next step, again disturbing the robot's equilibrium. Thus when a legged robot goes up or down stairs or moves within some other such environment that restricts the footfall position, the robot's position relative to the environment (for example, stairs) has to be controlled.

In U.S. Pat. No. 5,402,050, a system is described for controlling a legged mobile robot enabling the legged mobile robot to move rapidly and with a stable attitude on stairs and in other such environments that restrict movement. Since this system uses contact sensors as the position detection means, however, it has low durability.

Another object of this invention is therefore to provide an improvement on the earlier system, more specifically to provide a system for detecting position of a mobile robot position and controlling the same which increases durability through the use of non-contact sensors and which achieves a further improvement in the robot's ability to ascertain its position.

SUMMARY OF THE INVENTION

For realizing these objects, the present invention provides a system for detecting relative position/direction of a mobile robot in a space in which the mobile robot moves, comprising a space divider for dividing the space into at least two regions with different attributes at least by one of a line and an arc. A plurality of detectors are disposed in a line array on the mobile robot which generate different signals in response to the attributes of the regions and relative position/direction detecting means for receiving the signals of the detectors to detect relative position of the mobile robot with respect to the space divider.

BRIEF DESCRIPTION OF THE DRAWINGS

The above and other objects and advantages of the invention will be more apparent from the following description and drawings, in which:

FIG. 10 is an explanatory view of a third embodiment of the invention which uses a wheeled mobile robot and an arcuate ground landmark;

DETAILED DESCRIPTION OF THE PREFERRED EMBODIMENTS

Embodiments of the invention will now be explained based on a biped mobile robot and a wheeled robot as examples of mobile robots.

Figure 1:
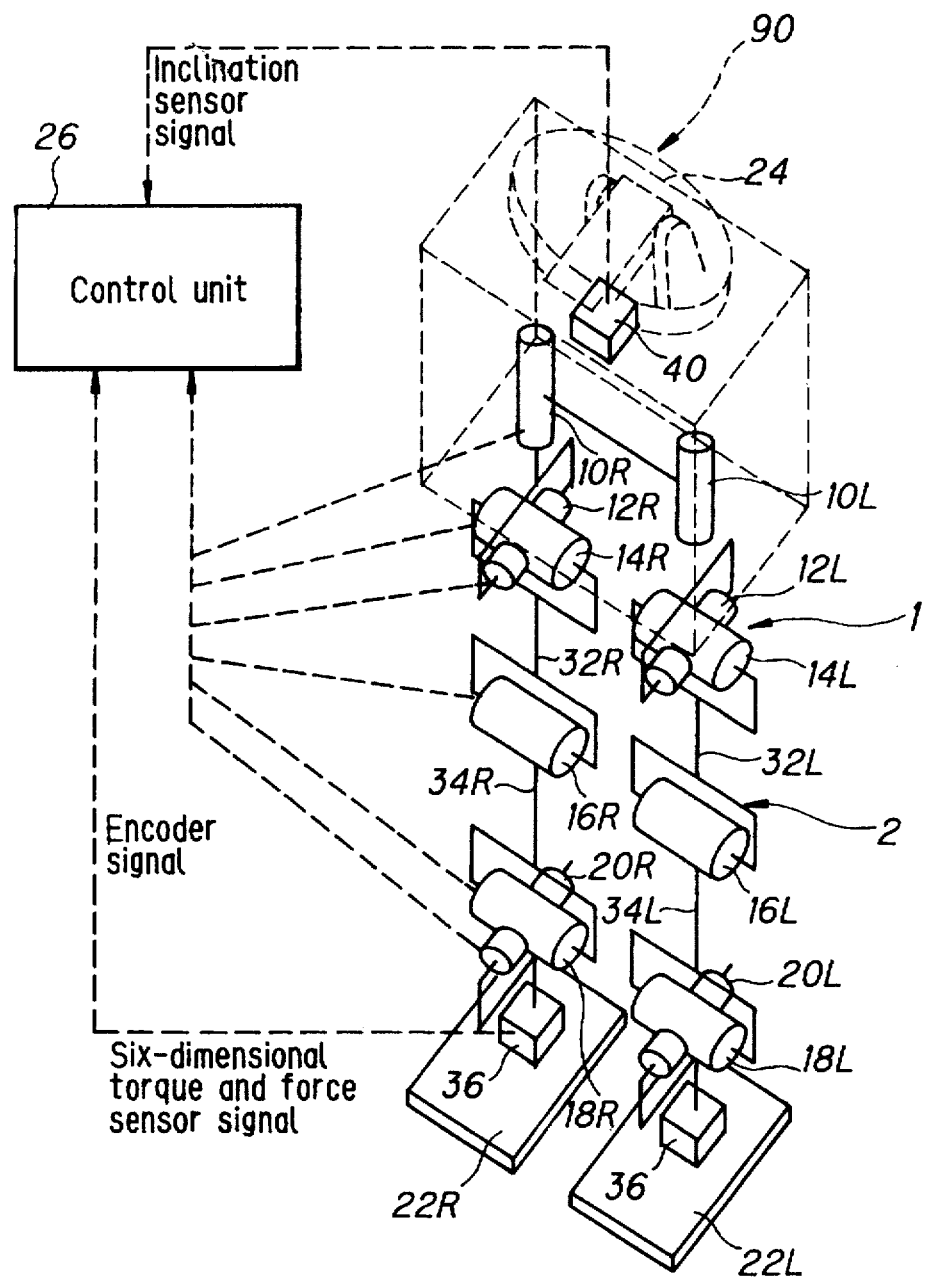
FIG. 1 is an overall view showing a system for detecting position of a mobile robot and for controlling the same according to the invention taking a biped locomotion robot as an example of the mobile robot.

An overall skeleton view of a biped mobile robot 1 is shown in FIG. 1. The robot 1 has left and right leg links 2 each having six joints. (To make the arrangement easier to understand, the joints are represented as the electric motors by which they are driven.) The six joints are, starting at the top, joints 10R, 10L for swiveling of the legs at the hip (R and L indicating the right and left sides), joints 12R, 12L for rotation at the hip in the pitch direction (about the x axis), Joints 14R, 14L for rotation at the hip in the roll direction (about the y axis), joints 16R, 16L for rotation at the knee in the roll direction, joints 18R, 18L for rotation at the ankle in the roll direction and joints 20R, 20L for rotation at the ankle in the pitch direction. Foot members (feet) 22R, 22L are provided at the lower end of this arrangement and a body (main unit) 24 housing a control unit 26 at the upper end.

The hip joints in the foregoing configuration are constituted by the joints 10R(L), 12R(L) and 14R(L) and the ankle joints by the joints 18R(L) and 20R(L). In addition, the hip and knee joints are connected by thigh links 32R, 32L and the knee and ankle joints by crus links 34R, 34L. The leg links 2 of the respective legs thus have six degrees of freedom, so that during locomotion the legs as a whole can be caused to execute the desired movements by driving the 6×2=12 joints (axis) to appropriate angles. The robot is thus capable of walking freely within three-dimensional space. The joints are provided mainly by motors and reduction gear mechanisms for increasing motor torque. The structure of the joints is described in detail in the assignee's earlier Japanese Patent Application No. 1(1989)-324,218 (Japanese Laid-open Patent Application No. 3(1991)-184,782) etc., and since it is not an essential aspect of the present invention, will not be explained further here.

The ankles of the robot 1 shown in FIG. 1 are provided with six-dimensional force and torque sensors 36 of conventional design. By measuring the x, y and z components Fx, Fy and Fz transmitted to the robot through the foot members and also measuring the moment components Mx, My and Mz around the three axes, the six-dimensional torque and force sensors detect whether or not the associated foot member has landed and the magnitude and direction of the forces acting on the supporting leg. As positional detection means, reflection type optical sensors 38 (not shown in FIG. 1) are provided on each foot member 22R(L) instead of the contact type load distribution sensors used in the earlier proposed system.

The top of the body 24 is provided with an inclination sensor 40 for detecting the robot's inclination and angular speed relative to the z axis in the x-z and y-z planes. Although not shown in FIG. 1, a zero reference switch 42 is provided at an appropriate place on the robot 1 for correcting the output of the inclination sensor 40. The outputs of the sensor 40 and the like are sent to the control unit 26 in the body 24.

Figure 2:
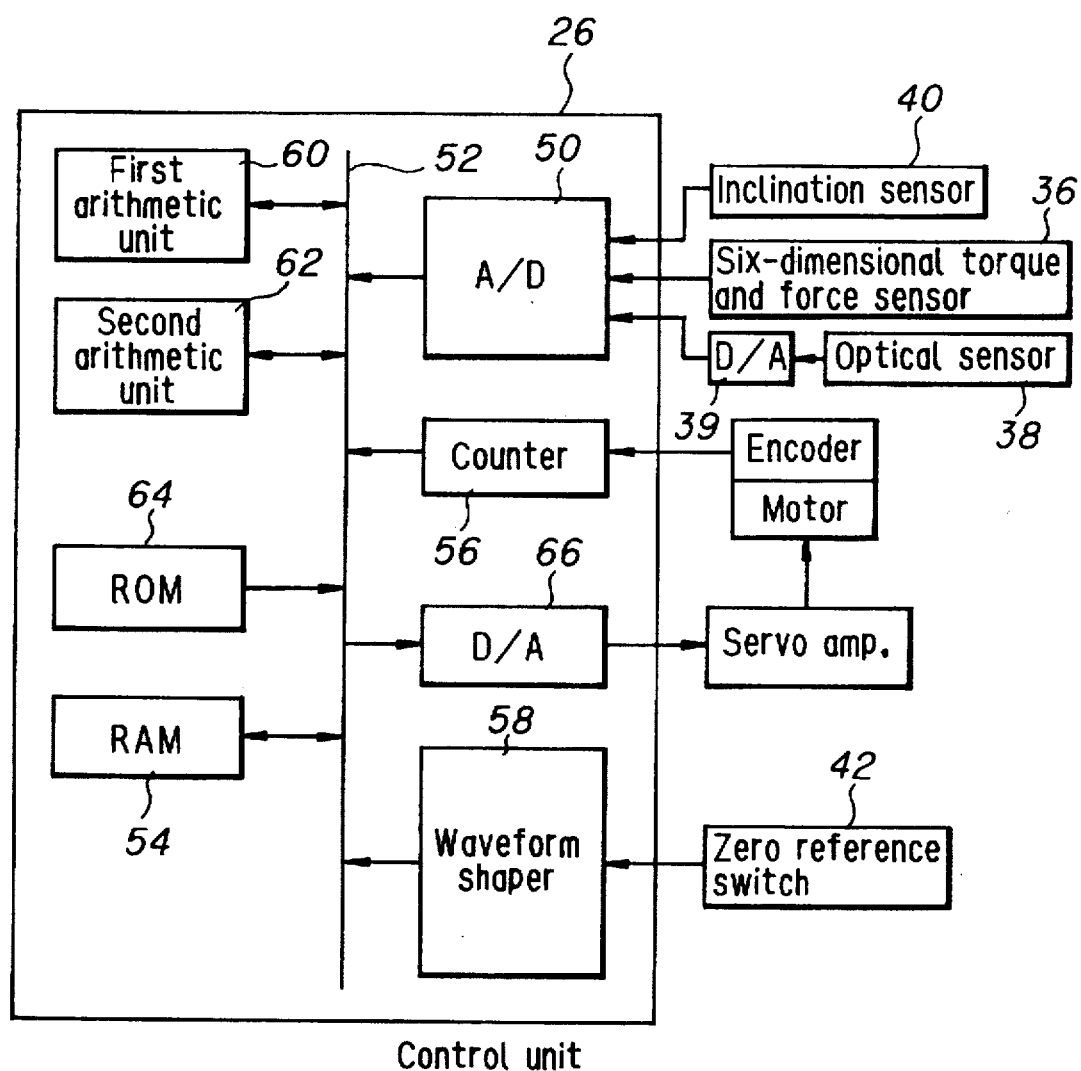
FIG. 2 is a block diagram showing the control unit illustrated in FIG. 1.

As shown in the block diagram of FIG. 2, the control unit 26 is constituted as a microcomputer. The outputs from the inclination sensor 40 etc. are converted into digital signals by an A/D converter 50 and the resulting digital values are sent via a bus 52 to a RAM (random access memory) 54. In addition, the outputs of encoders disposed adjacent to the respective motors are input to the RAM 54 through a counter 56, while the outputs of the zero reference switch etc. are stored in the RAM 54 via a waveform shaper 58. The control unit has first and second arithmetic units 60, 62 constituted as CPUs (central processing units). As explained further later, the first arithmetic unit 60 which reads gait parameters stored in a ROM (read-only memory) 64, computes desired joint angles and sends the calculated values to the RAM 54. As also explained further later, the second arithmetic unit 62 reads the desired values and the detected values from the RAM 54 and sends the control values required for driving the joints through a D/A converter 66 and a servo amplifier to the electric motors for driving the joints. The ROM 64 also stores environment map information regarding the workspace.

The optical sensor 38 mentioned earlier will now be explained with reference to FIGS. 3 and 4. Each optical sensor 38 comprises of optical detectors 382 and a sensor unit 384. Five optical detectors 382 are disposed in a line array on either side of each foot member 22R(L) for detecting reflected light from the ground surface of a light emitter. The optical detectors 382 transmit optical signals (reflected light) to the sensor unit 384 through an optical fiber cable 386. The sensor unit 384 converts the optical signal to a digital electric signal. Since each foot member is equipped with 10 optical detectors 382, it would be difficult, and disadvantageous in terms of wiring weight, to connect all of them with the control unit 26 housed in the body 24 by stringing optical fiber cables or electric signal transmitting cables along the leg links 2, particularly in view of the fact that the leg links 2 include many moving parts. Instead, therefore, the sensor units 384 are located as close as possible to the detection points. Specifically, they are installed inside the crus links 34R, 34L.

In addition, a single D/A converter 39 is installed inside each crus link 34R(L) in the vicinity of the sensor unit 384. The D/A converter 39 converts the outputs from each array of five optical detectors 382 into a single analog signal which it transmits to the A/D converter 50 in the control unit 26 via a multiconductor cable 72. In the control unit shown in FIG. 2, the A/D converter 50 converts the analog signal to a digital signal that can be numerically processed. The first arithmetic unit 60 reads required data from the A/D converter 50 via the bus 52 and appropriately processes the data for determining the output (ON/OFF) states of the 20 optical detectors 382 arranged in arrays of five on either side of each foot member. (An optical detector is ON when it receives reflected light.)

Figure 4:
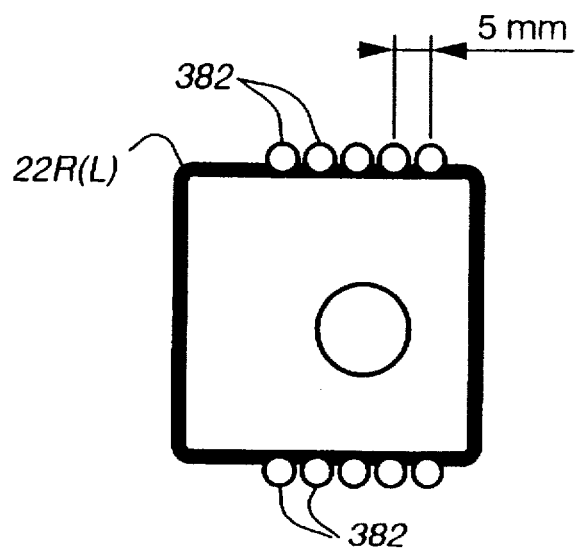
FIG. 4 is a plan view of the robot foot member showing the detailed location of the optical sensor illustrated in FIG. 3.
Figure 5:
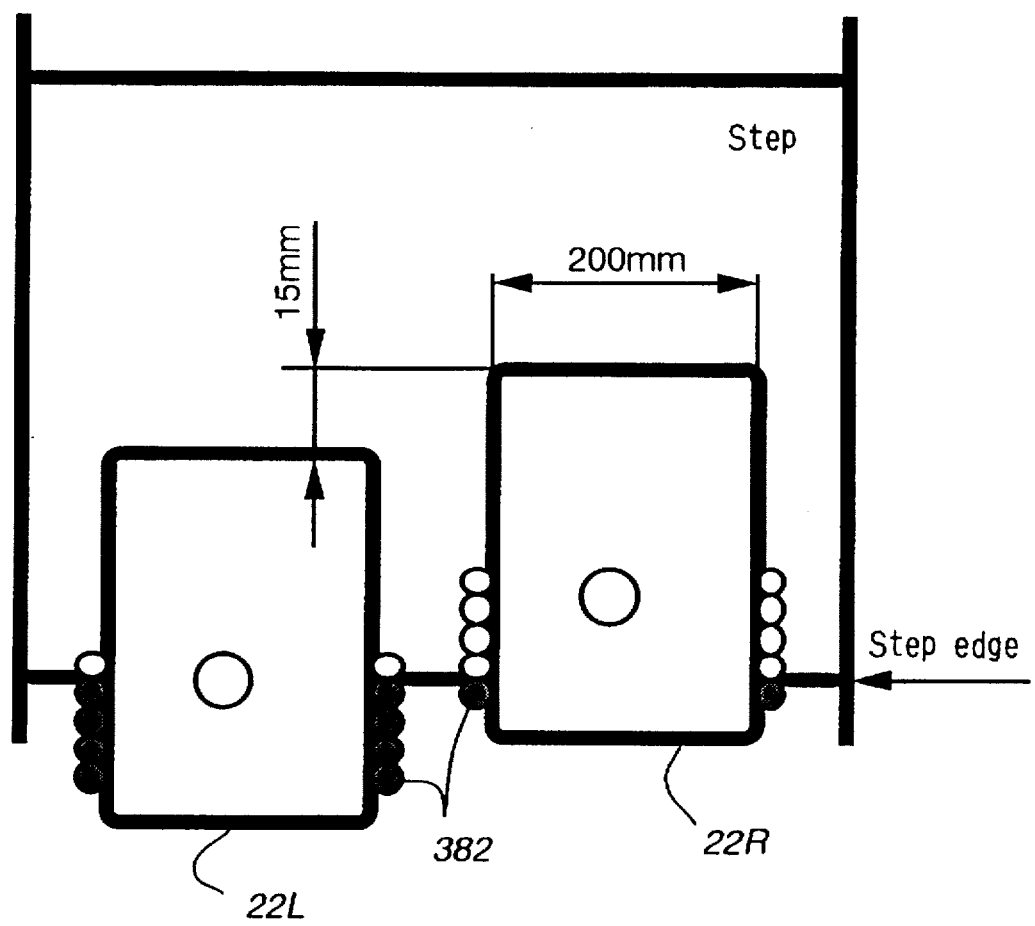
FIG. 5 is an explanatory view of the robot foot member on a step showing the detection range of the sensor where no landmark is provided on the step.
Figure 6:
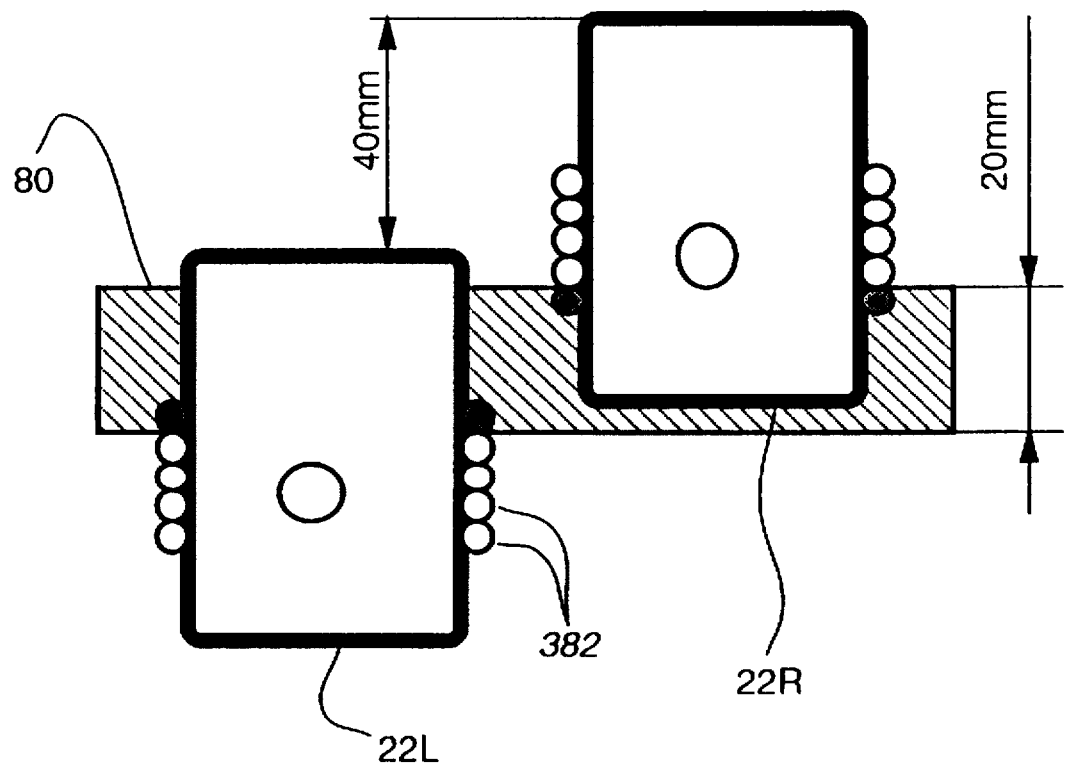
FIG. 6 is an explanatory view of the robot foot member on a step showing the detection range of the sensor where a landmark is provided on the step.

As shown in FIG. 4, in this embodiment the distance between the centers of adjacent optical detectors 382 in each array of five is 5 mm. As shown in FIG. 5, the width of each foot member 22R(L) is 200 mm. Since no positional information can be obtained when all of the sensors on one side of a foot member are ON or OFF, each five-member optical detector array is arranged such that when, for example, the edge of a step or the like is to be detected as shown in FIG. 5, the detection range corresponding to between 1 and 4 of the optical detectors being ON is up to 15 mm. If the detection range is set at 15 mm, the positional error in footfall control and the like has to be kept within this range. Since a detection range of 15 mm is too small in actual practice, however, the detection range is expanded by the use of landmarks. More specifically, as shown in FIG. 6, the width of a landmark 80 is made approximately equal to the length of the optical detector arrays. Thus if the center-to-center spacing of the optical detectors is 5 mm, the length of the detector array will be about 20 mm and the width of the landmark 80 is also made 20 mm. (This width is exaggerated in the drawing.) Owing to the presence of the landmark 80, the detection range is effectively expanded. In the embodiment under discussion it double to ±20 mm (40 mm).

Figure 7:
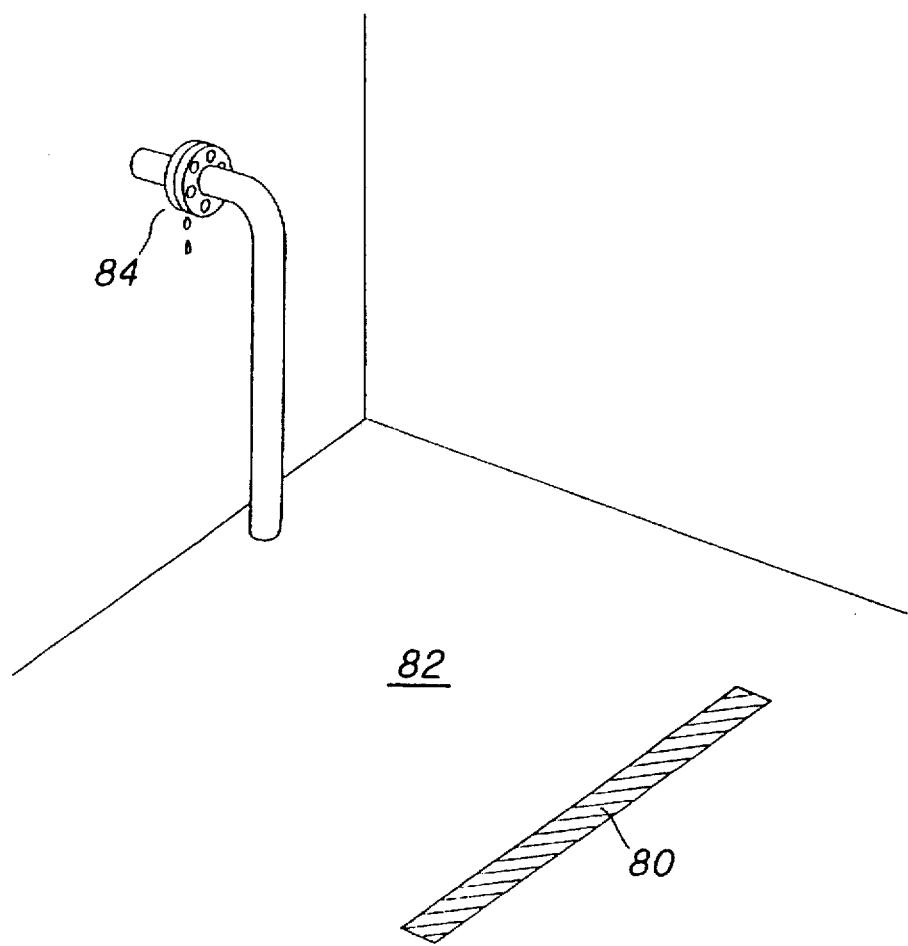
FIG. 7 is an explanatory view of the landmark comprising of black paint or the like applied on the ground.

As shown in FIG. 7, the landmark 80 comprises of black paint or other light absorbing material applied in a straight pattern over a prescribed area of the ground surface at an appropriate location in front of the work 84 to be inspected (a pipe flange in the illustrated example). The landmark 80 provided in this manner serves to divide the ground surface of workspace 82 into two regions with different brightness attributes. The optical detectors are OFF when they are over the landmark 80 and when the foot member is off the ground.

Figure 3:
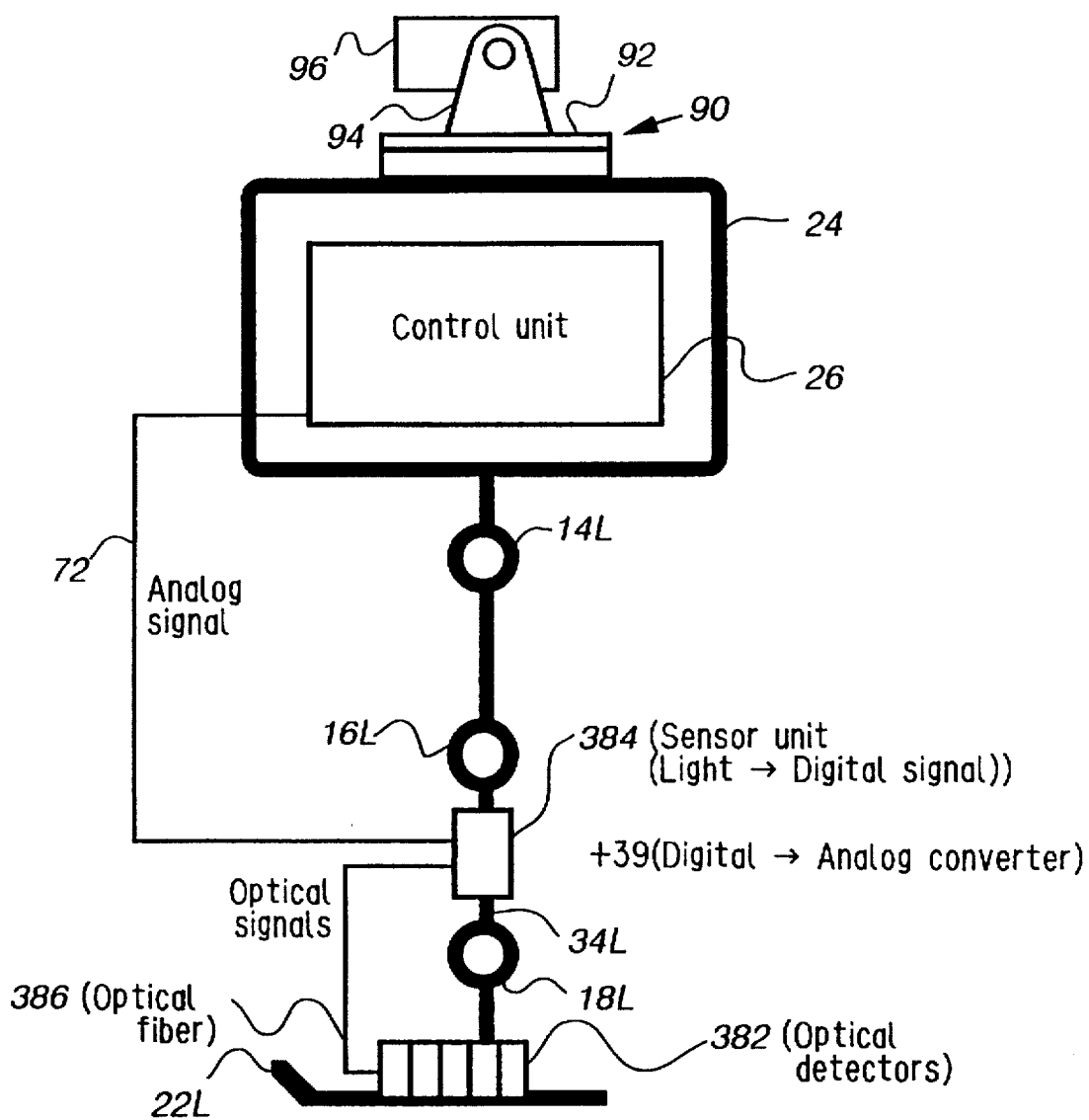
FIG. 3 is a side view of the mobile robot of FIG. 1 showing the location of an optical sensor.

As shown in FIGS. 1 and 3, the robot 1 has an inspection system 90 mounted on top of its body 24. The inspection system 90 includes a table 92 that can rotate in the horizontal plane (x-y plane) and a camera 96 that is mounted on posts 94 rising from the top of the table 92 and can swing vertically (in the x-z plane). The table 9 and the camera 96 are driven via appropriate means (not shown). When the robot 1 has advanced to a position near the work, the table 92 and the camera 96 are swung so that the camera 96 can image it. The presence/absence of abnormalities is then determined by processing the image. Since the object of the invention is to detect position and control locomotion, the means for driving and controlling the table and camera and for processing the image are not shown in the FIG. 2 and will not be explained further here.

In the system configured as described in the foregoing, since the robot's foot members 22R and 22L touch down on the landmark 80 as the robot 1 walks toward the work 84, the robot 1 is able to ascertain its current position in the workspace relative to the landmark 80. In addition, since a pair of optical sensors 38 is provided and one of the pair is mounted on each of the foot members 22R and 22L, the robot 1 can detect the angles of its foot members 22R and 22L (and accordingly the angles of its leg links 2) relative to the landmark 80 by comparing the outputs of the pair of optical sensors 38. Then, based on boundary map information and visual information obtained through the camera 96, the robot 1 can accurately approach the work and operate the table 92 and the camera 96 for carrying out the inspection.

Figure 8:
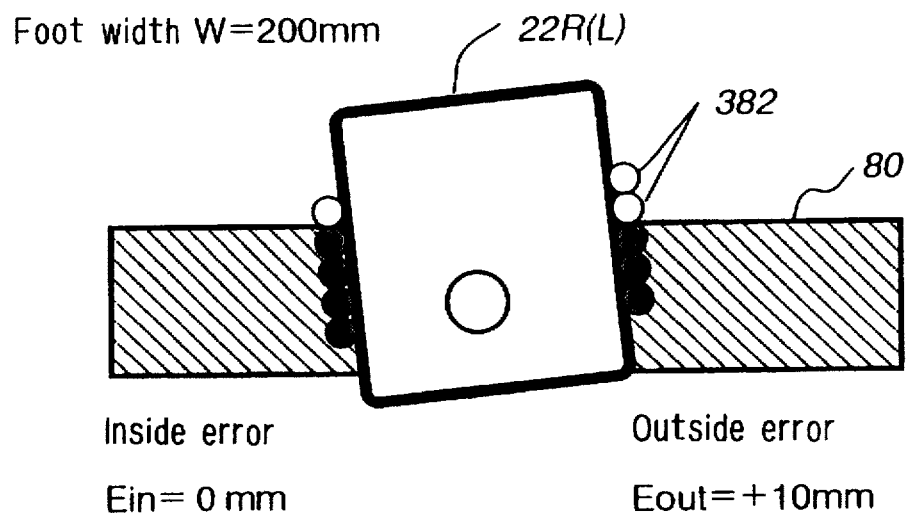
FIG. 8 is an explanatory view showing positional error detection of the robot foot member.

Fore-and-aft positional offset (error) of a foot member 22R(L) is defined as the average of the errors at the outer and inner sides of the foot member. As shown in FIG. 8, angular error of a foot member 22R(L) is calculated by dividing the difference between the errors detected by the outside optical detectors and the inside optical detectors by the width of the foot member and finding the arc tangent of the quotient. In this embodiment, the two rows of optical detectors used for measuring the angular deviation are provided on opposite edges of the foot member so as to increase the detection resolution by maximizing the distance between the two rows.

Since the detection is carried out in the foregoing manner in this embodiment, the robot can easily ascertain its position in the workspace relative to the landmarks and can then easily reach the work by use of boundary map information or the like. Owing to the simplicity of the configuration, moreover, it suffices to use a relatively low performance microcomputer in the control unit 26.

Figure 9:
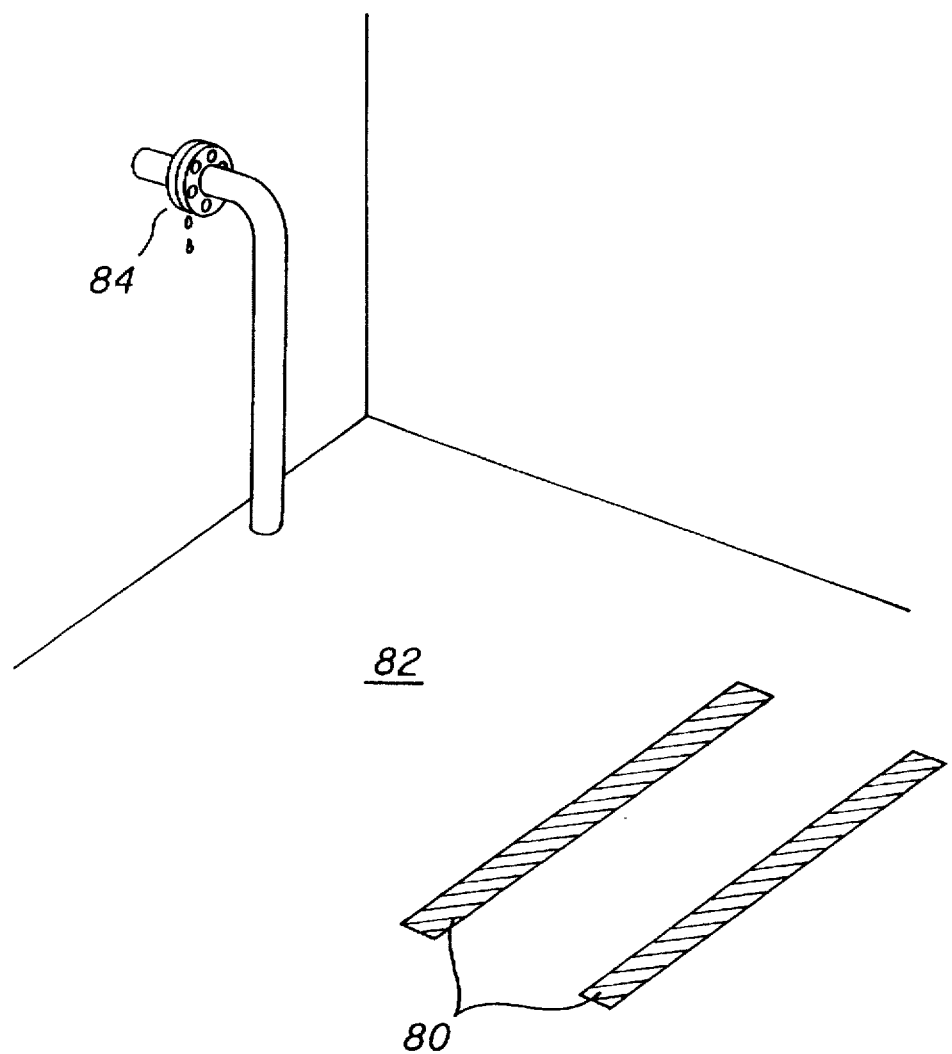
FIG. 9 is an explanatory view, similar to FIG. 7, but shows a second embodiment of the invention.

FIG. 9 shows a second embodiment of the invention in which multiple landmarks 80 are provided. In this case, the position and angle relative to the work 84 can be detected based on boundary map information from either of the landmarks 80.

It would be possible for the first and second embodiments to detect the angle relative to the landmark 80 even if the optical detector arrays were provided on only one foot member 22R(L). However, since the robot's feet do not arrive in the vicinity of the landmark 80 side by side but one ahead of the other, the provision of the optical detector arrays on both foot members in these embodiments increases the probability of one or the other of the feet landing on the landmark 80.

Moreover, in the first and second embodiments, the robot's legs are driven such that after the robot has come into the vicinity of the landmark(s) 80 its stride is controlled, at or just before halting, to no more than substantially twice the width of the landmark(s) 80 in the direction of advance. As a result, the Optical detector arrays of at least one foot member is certain to fall on a landmark 80, thus ensuring detection.

It therefore becomes possible to move from a distant location to the final inspection position by dead reckoning (stride parameter among the gait parameters x number of steps) based on internal sensors and thus to increase the distance over which dead reckoning can be employed. Since increasing the dead reckoning distance reduces the frequency with which the camera 96 and other external sensors are used, it has the effect of preventing an increase in processing time owing to the complexity that tends to arise in the processing of data from external sensors. The resulting increase in locomotion speed enhances the utility of the robot.

Figure 11:
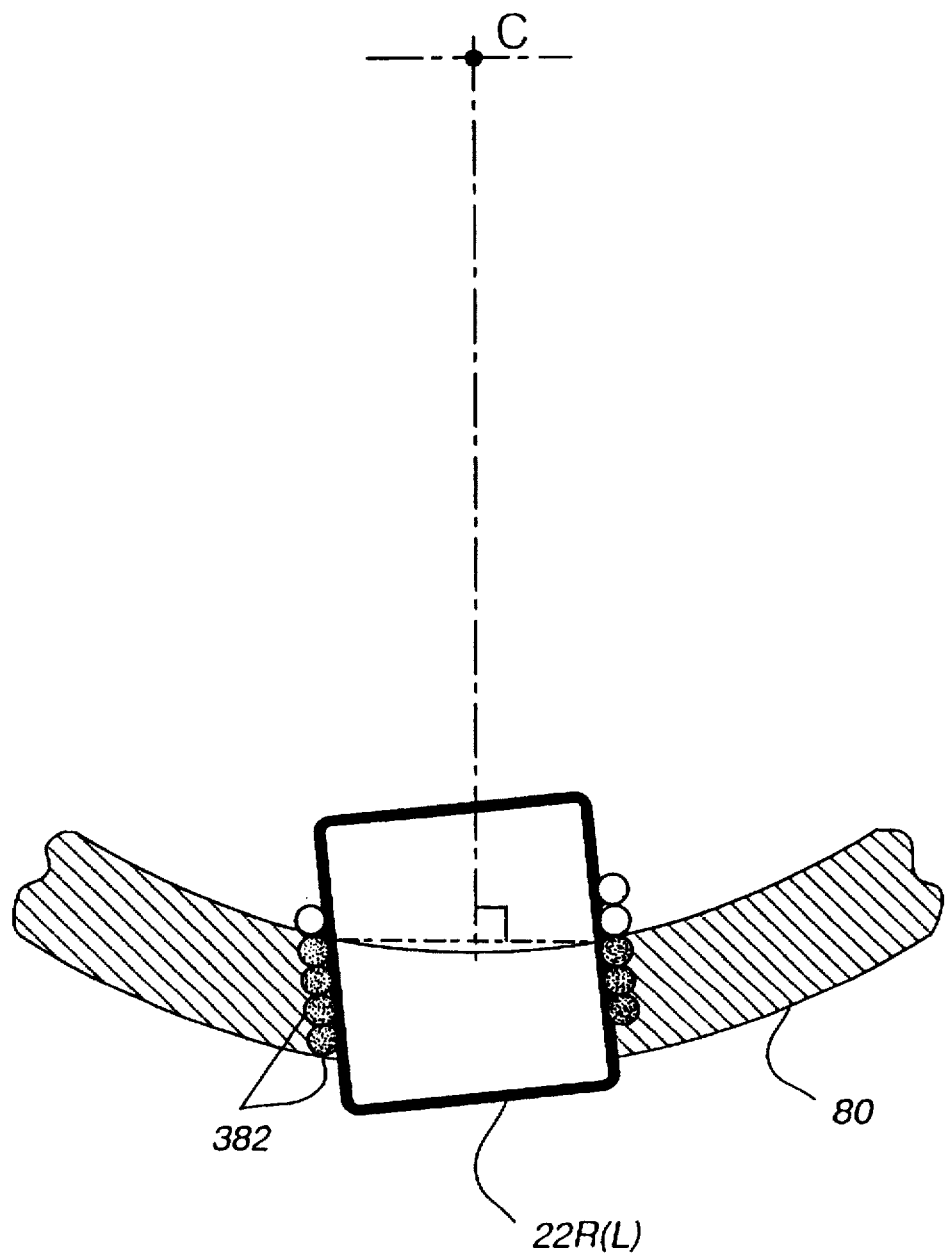
FIG. 11 is an explanatory views of the arcuate ground landmark of FIG. 10 which has its center at a point C on a line extending vertically from a work.

FIG. 10 is an explanatory view of a third embodiment of the invention, which uses a wheeled mobile robot 100. An array of the optical detectors 382 of the optical sensor 38 is mounted on either side of the body of the robot near ground surface level. (FIG. 10 shows only the array on one side.) As shown in FIGS. 10 and 11, in the third embodiment the landmark 80 is defined as an arcuate ground surface region having its center at a point C on a line extending vertically from the work 84. In the first and second embodiments, since the use of the linear landmark 80 makes it impossible for the robot to detect its position on the landmark 80, it is necessary for the camera 96 of the inspection system to locate the work 84 by scanning along an imaginary line is space. As shown in FIG. 11, on the other hand, the robot according to the third embodiment can accurately ascertain its absolute position and its orientation with respect to the center C of the arc (the work) by calculating the line perpendicularly bisecting the line connecting two optical detectors 382 of the arrays on opposite sides of the robot body. (Similarly to the second embodiment, the third embodiment can also use two or more landmarks 80. Moreover, the center C may be located immediately on the work 84 itself if the work 84 is on the ground.)

Since in all of the first to third embodiments the robot can quickly ascertain its position after coming into the vicinity of the work and can then accurately aim its inspection system 90 in the calculated work direction, it does not have to search for the work 84 by making trial-and-error changes in its position and orientation. Energy consumption, a primary concern for an autonomous robot, is therefore markedly reduced.

While it was pointed out that the first to third embodiments require the robot's feet to land on the landmark(s), this may occasionally fail to occur owing to inaccurate or erroneous dead reckoning. Such cases are rare, however, and when they occur it suffices for the robot to use the camera 96 to ascertain its position and the amount of deviation relative to the landmark. Even in such cases, therefore, the landmark functions as a characteristic environment feature which enables the robot to ascertain its position more easily than by extracting features from the architectural environment. By the same token, it reduces the load on the computer.

Figure 12:
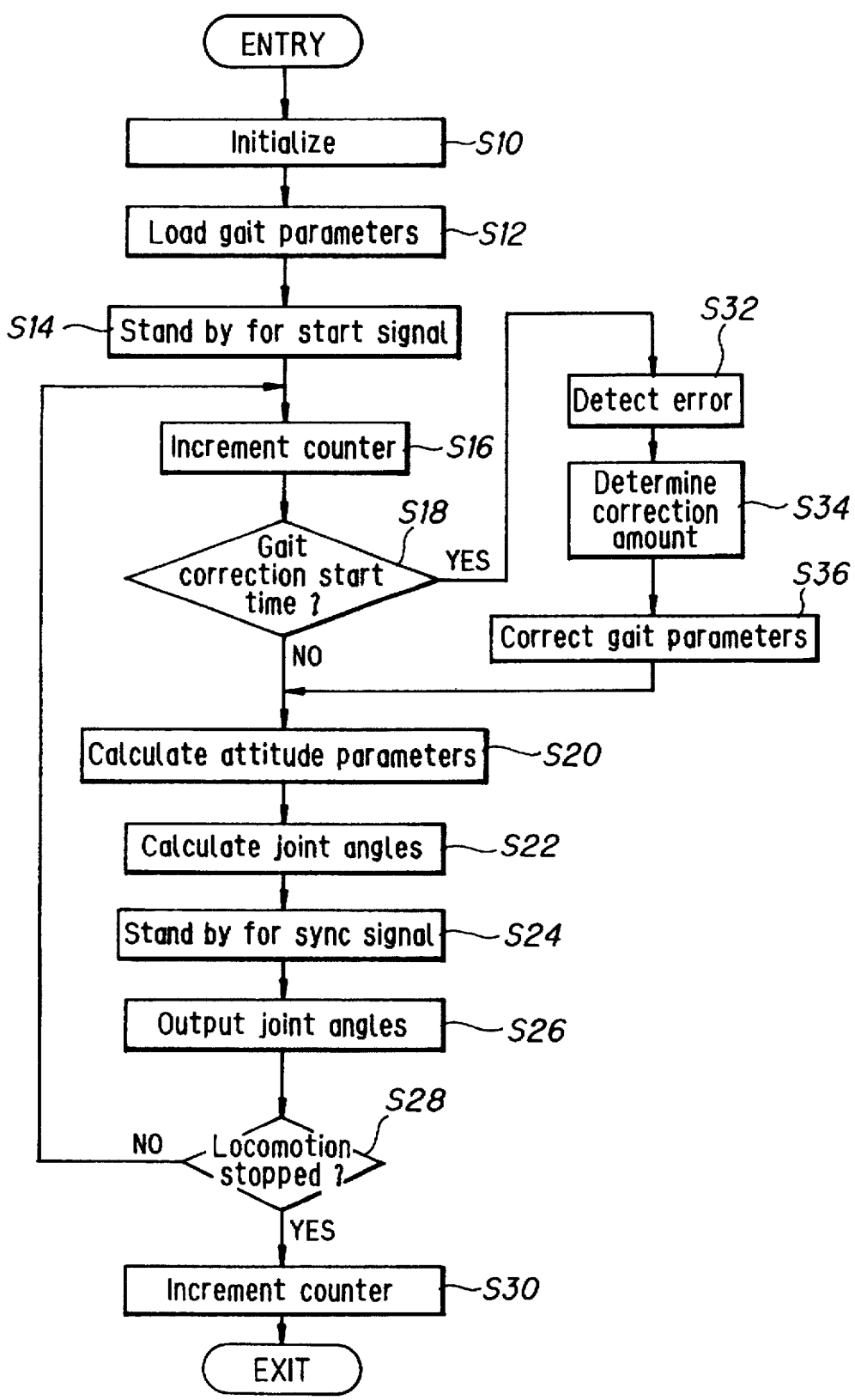
FIG. 12 is a flow chart showing the operation of the system according to a fourth embodiment of the invention.
Figure 13:
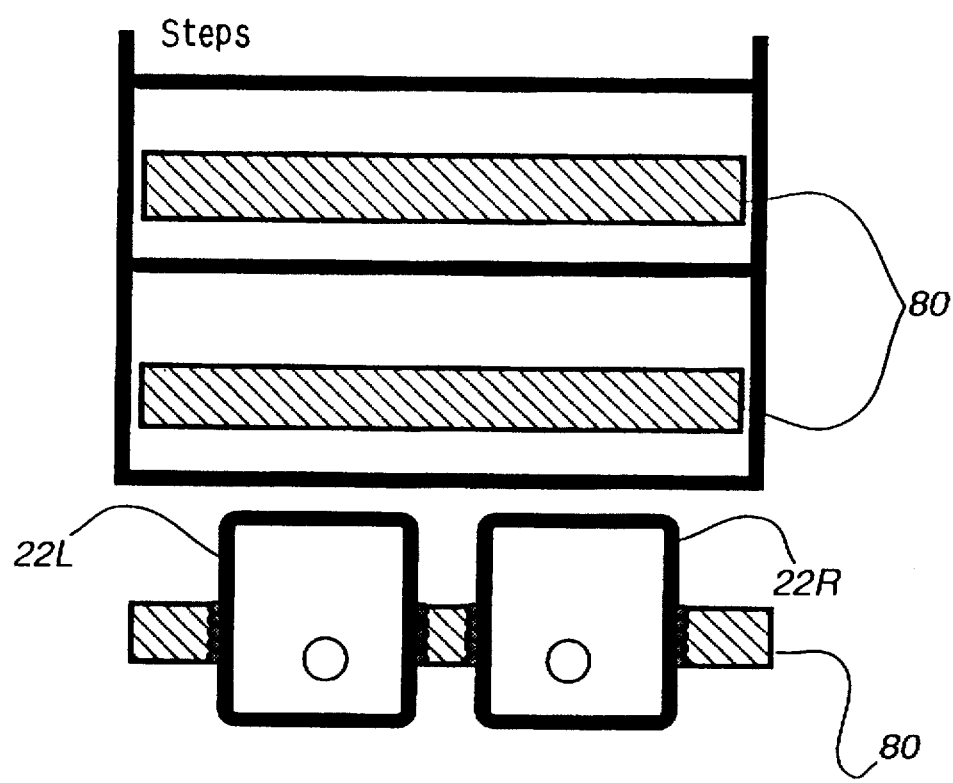
FIG. 13 is an explanatory view of the landmarks provided in front of the stairs on every step thereof to be used in the fourth embodiment.

FIG. 12 is a flow chart of a routine according to a fourth embodiment of the invention. The routine of this flow chart defines the operations of the locomotion control system of this invention in the case where the legged mobile robot described in connection with the first embodiment ascends and descends stairs. As shown in FIG. 13, the control system utilizes landmarks 80 provided in front of the stairs on every step thereof.

This fourth embodiment is an improvement on the system proposed earlier in U.S. Pat. No. 5,402,050. One point of improvement is in the position detection means. The earlier system, which used contact type load distribution sensors, had a problem regarding durability owing to wear and tear incurred by these sensors as a result of the heavy load and footfall impact acting on the bottom of the robot's feet during locomotion. As was mentioned earlier, this problem was overcome by the use of the optical sensors 38. A second point of improvement is increased position detection accuracy during stair climbing and descent. The following is a brief explanation of the fourth embodiment. Further details can be found in the earlier application.

The control presumes that the robot is able to climb or descend several steps without need for control of its position relative to the stairs, in other words that the positional relationship between the robot and the stairs is within a range enabling locomotion and that the amount of positional error occurring each time a step is ascended or descended is small. Since this is generally the case in actual applications, control is not conducted for causing the foot of the free leg to land precisely at the desired position. Instead, the positional error arising at any given step is tolerated and control is conducted for preventing the positional errors from accumulating. As a result, the robot can continuously climb or descend stairs while controlling the amount of positional error between itself and the stairs to within the aforesaid range enabling locomotion.

Figure 14:
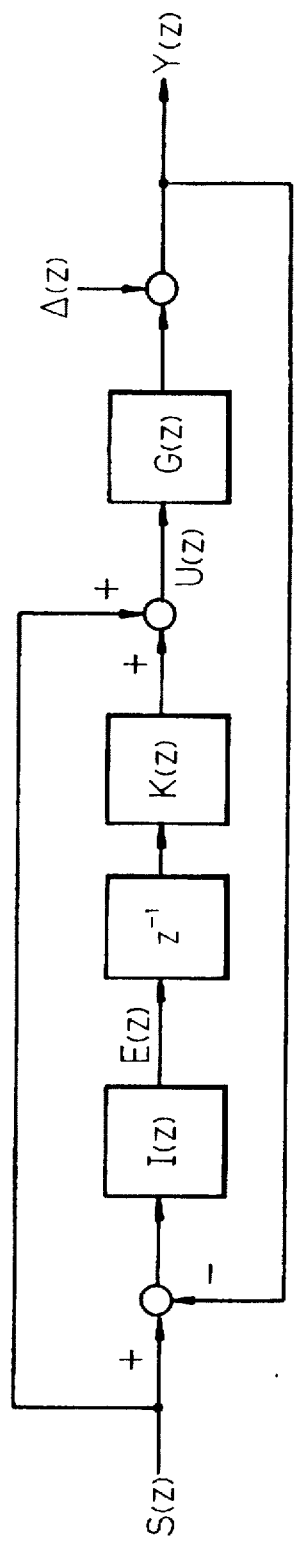
FIG. 14 is a block diagram showing the characteristic feature of the system according to the fourth embodiment of the invention.

This control is shown in detail in the block diagram of FIG. 14, in which S(z) is the desired footfall position (target value), U(z) is the locomotion command value (control input), Y(z) is the actual footfall position (controlled value), E(z) is the relative error (control error), Delta (z) is disturbance, I(z) is the integral element, (1/z) is the sampling delay element, K(z) is the control system, and G(z) is the pulse transfer function from the stride command value of the robot (subject of control) to the actual stride. The relationships among these are expressed by Eqs. (1) and (2).

$$Y(z) = \frac{G(z)\{1 + z^{-1}I(z)K(z)\}}{1 + z^{-1}I(z)K(z)G(z)} S(z) + \tag{1}$$

$$\frac{1}{1 + z^{-1}I(z)K(z)G(z)} \Delta(z)$$

$$= \frac{G(z)\{z - 1 + K(z)\}}{z - 1 + K(z)G(z)} S(z) +$$

$$\frac{z - 1}{z - 1 + K(z)G(z)} \Delta(z)$$

$$E(z) = \frac{z\{1 - G(z)\}}{z - 1 + K(z)G(z)} S(z) - \tag{2}$$

$$\frac{z}{z - 1 + K(z)G(z)} \Delta(z)$$

Simplifying by defining G(z) as gain G and the gain of the control system K(z) as k, yields Condition for stabilization |z| < 1

$$\left. \begin{array}{l} 1 - kg < 1 \rightarrow -kg < 0 \rightarrow kg > 0 \\ -1 < 1 - kg \rightarrow -2 < -kg \rightarrow kg < 0 \end{array} \right\} 0 < kg < 2 \tag{3}$$

If the step depth (L) (see FIG. 15) is constant, then since the desired position changes with the step shape, the corresponding steady-state error becomes as shown in Eq. 4 and converges in accordance with k, g, L.

$$e^{\infty} = \lim_{z \to 1} (1 - z^{-1}) \cdot \frac{z}{z - 1} \cdot L \cdot \frac{z(1-g)}{z - 1 + kg} \tag{4}$$

$$= \lim_{z \to 1} \frac{z(1-g)}{z - 1 + kg} L$$

$$= \frac{1-g}{kg} L$$

Similarly, the steady-state error and the impulse-like disturbance and the step-like disturbance with respect to the magnitude D becomes as shown in Eq. 5 and Eq. 6, and become 0 (zero) or converge on a fixed value in accordance with g and D.

$$e^{\infty} = \lim_{z \to 1} (1 - z^{-1}) \cdot z^{-t} \cdot D \cdot \frac{z}{z - 1 + kg} \tag{5}$$

$$= \lim_{z \to 1} \frac{(z - 1) \cdot z^{-t}}{z - 1 + kg} D$$

$$= \frac{0}{kg} D$$

$$= 0$$

$$e^{\infty} = \lim_{z \to 1} (1 - z^{-1}) \cdot \frac{Dz}{z - 1} \cdot L \cdot \frac{z}{z - 1 + kg} \tag{6}$$

$$= \lim_{z \to 1} \frac{z}{z - 1 + kg} D$$

$$= \frac{1}{kg} D$$

It suffices to decide the gain k so that the error in relative position converges rapidly and the steady-state error is confined within the tolerable range. In addition, by including the integral element in the control system K(z), the step-like desired value and the steady-state error with respect to the step-like disturbance can be made 0 (zero).

Figure 16:
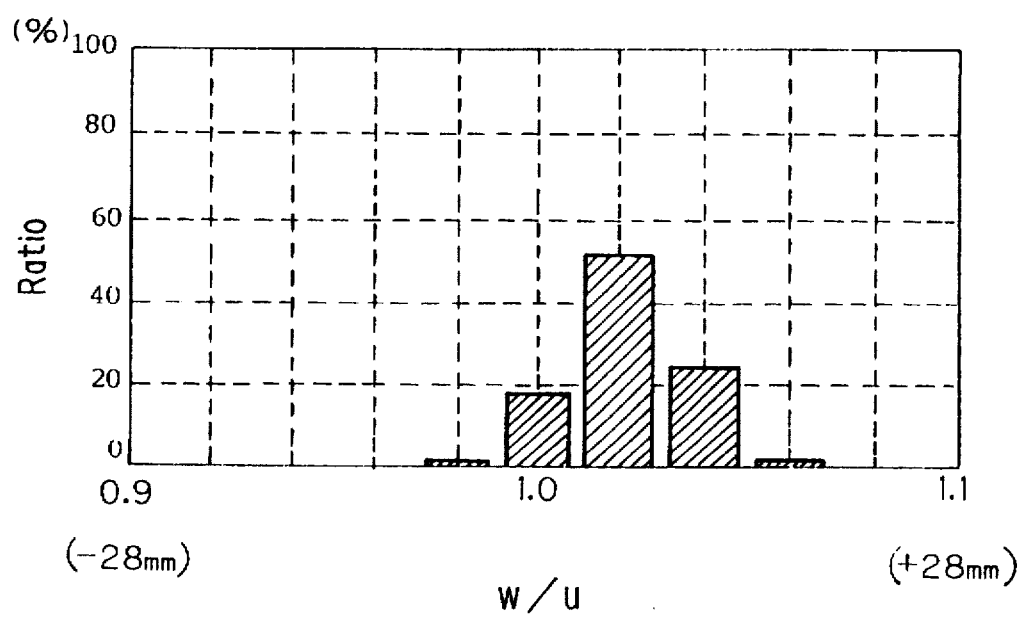
FIG. 16 is a histogram showing errors between desired and actual foot landing positions.

G(z) was first determined as the gain g. FIG. 16 represents x(n)/u(n) in a histogram. While G(z), namely g, should best be determined without including the effect of disturbance, it was determined as n(n)/u(n) owing to the difficulty of detecting w(n). Since disturbance can be presumed to be the main cause for the wide spread at the bottom, there is no problem in using G(z) as the gain. As the center of the distribution is at 1.02, setting g=1.02 should be acceptable. So as to evaluate on the safe side, however, it was set to 1.06. The control system was set to gain k. In light of Eq. 3, the condition required for achieving a stable control system is 0<k<1.89 (≅2/g). While Eq. 4 etc. show that the steady-state error decreases as k increases, k was set to between 0.5 and 0.75 to prevent oscillation of the control system characteristics and give the gain a degree of latitude.

Figure 17:
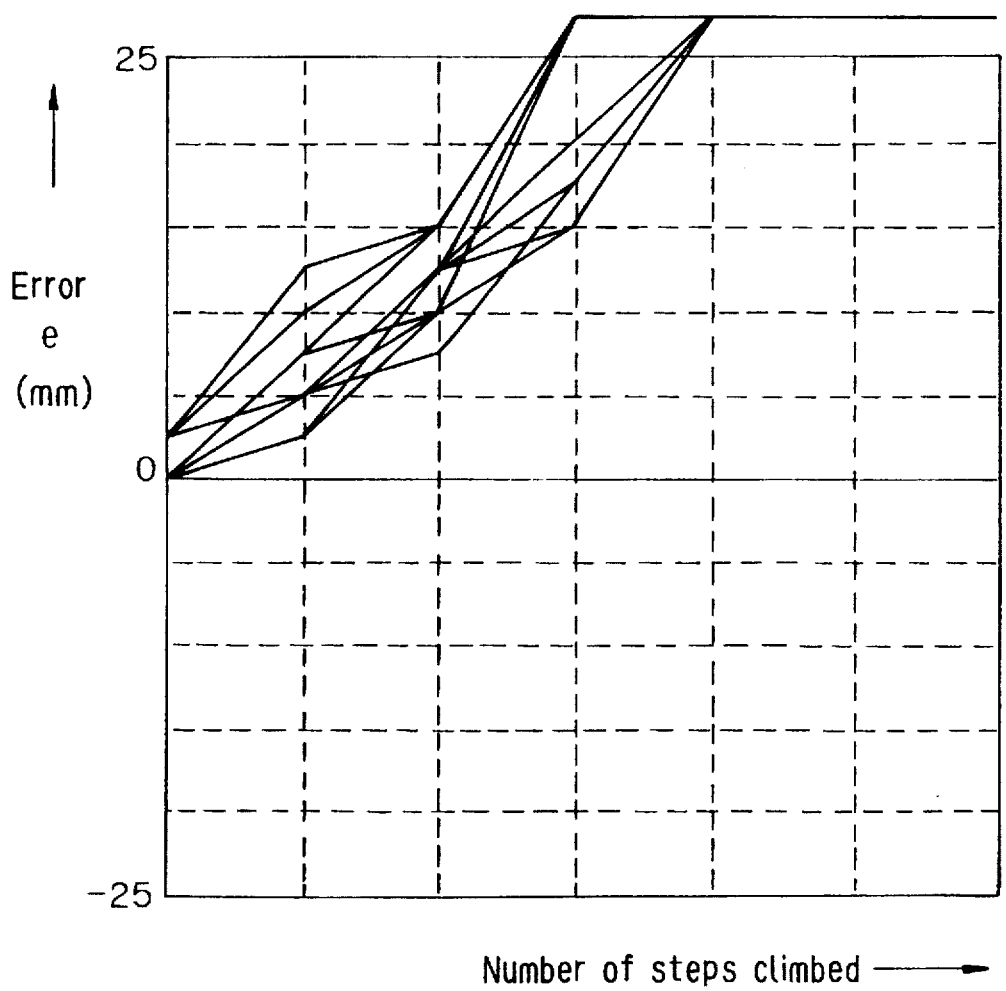
FIG. 17 is test data showing errors between desired and actual foot landing positions when the control according to the fourth embodiment was not conducted.
Figure 18:
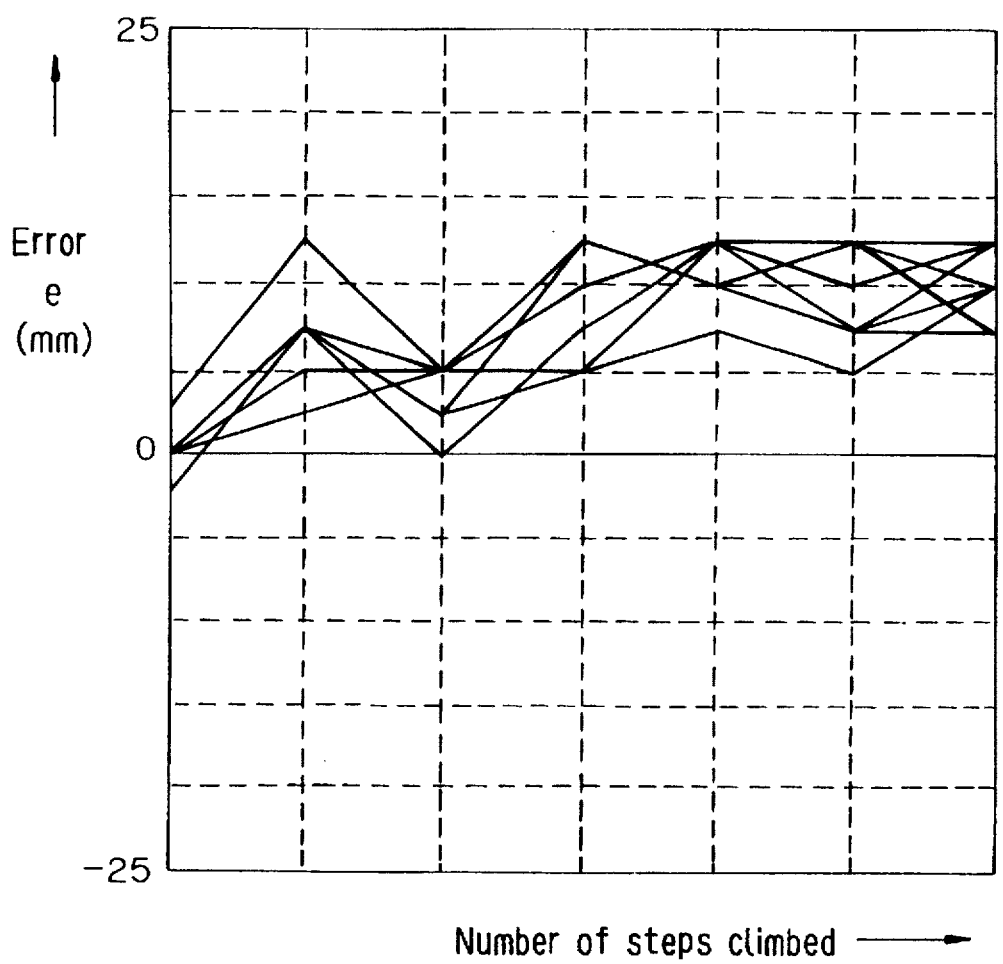
FIG. 18 is test data showing errors between desired and actual foot landing positions when the control according to the fourth embodiment was conducted.
Figure 19:
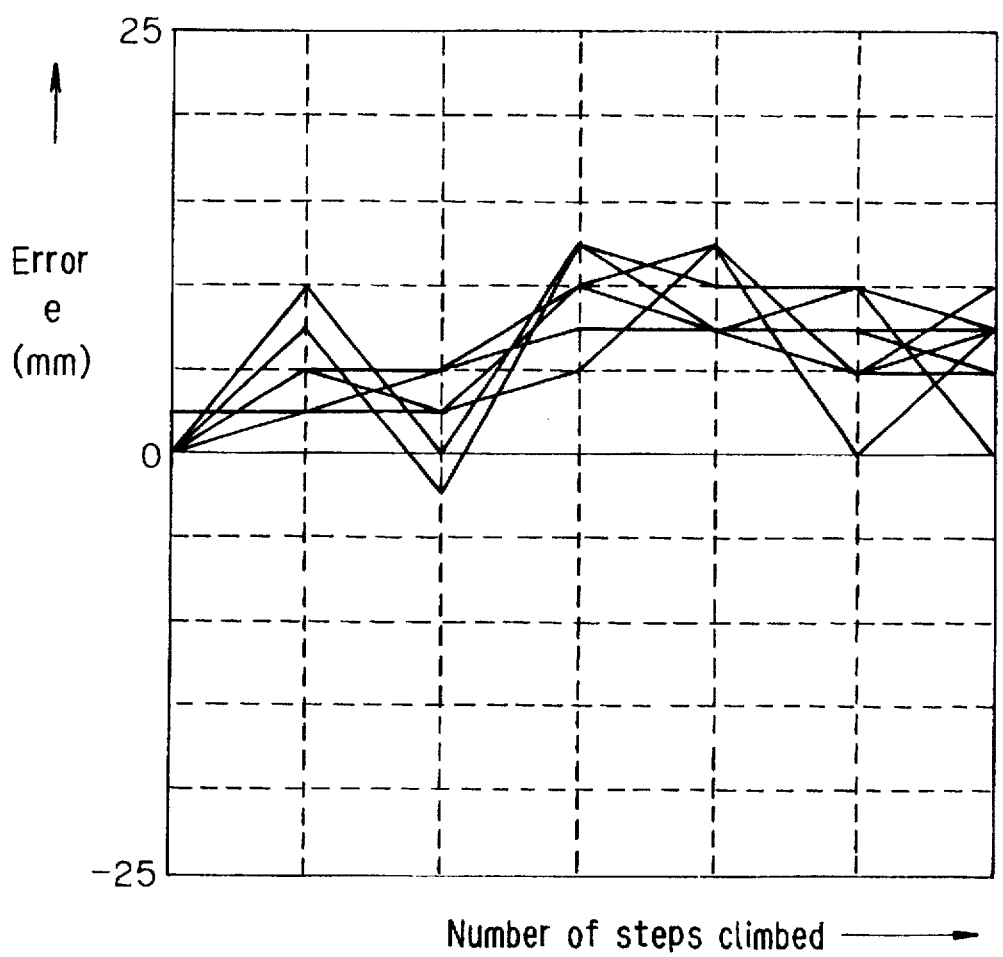
FIG. 19 is similar to FIG. 18, but shows another test data when the control according to the fourth embodiment was conducted.

For comparison, the results when this control was not implemented are shown in FIG. 17 and those when it was implemented in FIGS. 18 and 19. FIG. 18 is for the case of k=0.5 and FIG. 19 for the case of k=0.75. The step depth was 280 mm in either case. As is clear from FIG. 17, the relative positional error increased approximately linearly and became greater than 20 mm at the third or fourth step. As can be seen in FIGS. 18 and 19, on the other hand, when the control according to this embodiment was implemented, the relative positional deviation did not diverge but converged on a substantially fixed value. For k =0.5 the relative positional error was about 10 mm, while for k=0.75 it converged on about 7.5 mm. According to Eq. 4, when g=1.02 the relative positional error is 11 mm for k=0.5 and 7 mm for k=0.75. Thus the results of the control are in good agreement with the theoretical values.

Based on the foregoing, the operation of the control system will now be explained with reference to the flow chart of FIG. 12.

After the various parts of the system have been initialized in S10, the gait parameters are loaded from the ROM 64 in S12. The gait of the robot is designed beforehand with emphasis on mechanical stability and is stored in the ROM 64 in the form of gait parameters. The gait parameters are expressed in terms of, for example, the desired footfall position of the foot of the free leg. The system then stands by for a start signal in S14. When the start signal is issued, a counter is incremented in S16 and a check is made in S18 as to whether or not it is time to start gait correction (gait correction start time). This will be explained later.

Figure 20:
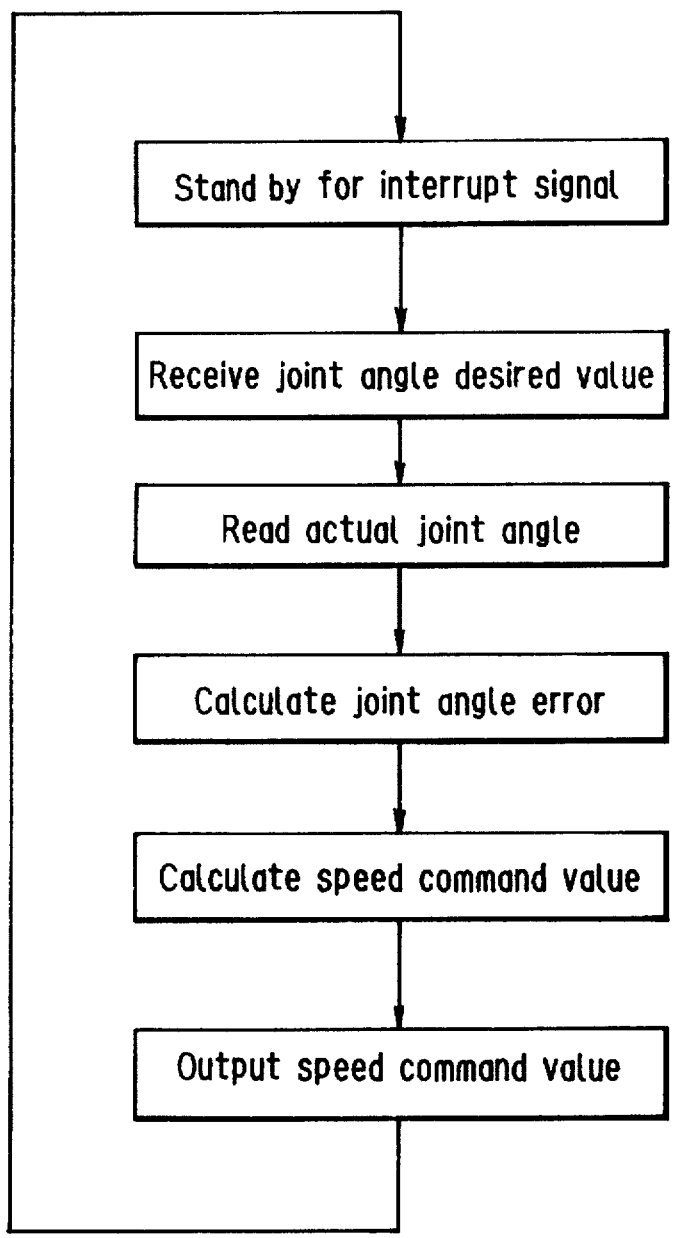
FIG. 20 is a flow chart showing the servo control based on the desired joint angles determined in the program illustrated in FIG. 12.

If the result in S18 is negative, the attitude parameters are calculated in S20. Specifically, since some of the aforesaid gait parameters require interpolation, the calculations for this are carried out here to obtain the attitude parameters at the time designated by the counter of S16. The system then waits for a synchronization signal in S24. After synchronization, the calculated joint angles are output in S26 and a check is made in S28 as to whether or not locomotion is to be stopped. If the result in S28 is negative, the same procedures are repeated from S16 until the result in S28 becomes affirmative, at which time the counter is reset in S30 and the routine terminated. In other words, the loop consisting of S18 to S28 is executed once every unit time period (e.g., 20 ms) of the counter of S16. In parallel with the execution of this loop, the second arithmetic unit 62 conducts servo control in accordance with the flow chart of FIG. 20 for achieving the joint angles indicated by the output in S26. Since this control is well known, it will not be described further here.

The foregoing procedures enable the robot to execute the mechanically stable gait designed beforehand. Although not explained here, control is also simultaneously conducted for maintaining locomotion stability against disturbances. The prior-art control method explained up to this point enables the robot to continue to ascend or descent stairs until its positional error accumulates to the point of falling outside the range in which locomotion is possible. In the ascent and descent of ordinary steps having a depth of 280 mm, it was found that under such control the range of positional error within which locomotion is possible is ±60 mm and that on average the positional error arising during each step ascended or descended is between 5 and 10 mm, although the exact value depends on the environment and amount of disturbance. This means that the robot can continuously climb or descend 10 steps.

In the control under discussion, the gait correction start time checked in S18 of the flow chart of FIG. 12 is defined as the time point at which the foot rises from the ground surface (footrise). The time for detecting positional error is set at the footrise time because this makes it possible to utilize the entire period during which the foot is free for correcting the free leg trajectory based on the positional error detected and fed back to the desired footfall position at the very beginning of free period, thereby enabling a smooth (not jerky) transition to the corrected gait and minimizing gait stability degradation, and also because starting the gait correction from the footrise time makes it possible to use the most recent positional error information for correction.

When S18 finds that the footrise time has arrived, the positional error at the step being ascended or descended is ascertained in S32 by using the optical sensor 38 mounted on the foot member 22R(L) to detect the edge of the step and then comparing the detected edge position with the desired edge position set out in the gait parameters. After this, the detected relative positional and angular errors are used in S34 for deciding an appropriate desired stride correction amount for preventing these errors from accumulating and the desired footfall position set out in the gait parameters is updated accordingly in S36.

Figure 15:
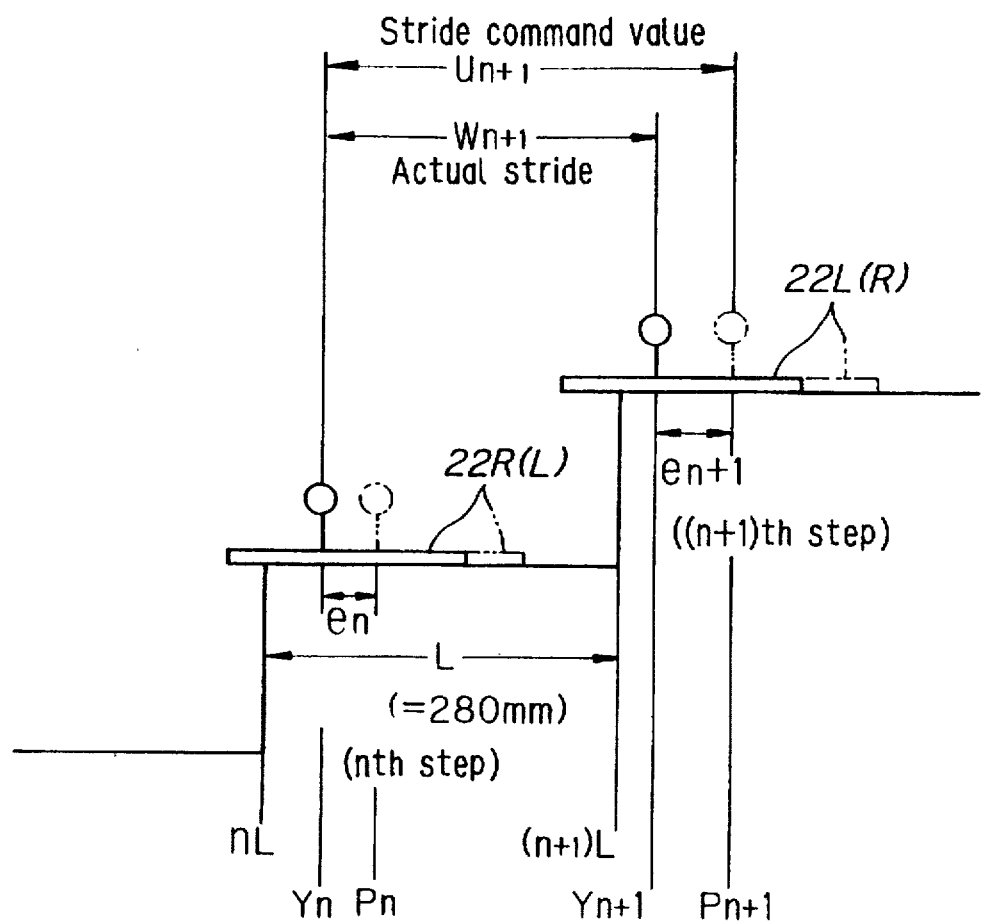
FIG. 15 is an explanatory view showing the details of stairs of FIG. 13.

After the target footfall position has been updated, the robot's gait, specifically its stride, is changed from that designed in advance. If, for instance, the relative positional error on an arbitrary step is +20 mm and the gain k is 0.5., then, as shown in FIG. 15, the stride of the robot's next step is set to 280 mm (step depth)–(20 mm×0.5)=270 mm. Since the footfall position of the foot member 22R(L) is expressed in terms of position on the x, y and z axes and the angle of rotation about these axes, some or all of the positions and angles are corrected for changing the stride. Repeating the foregoing procedures for each succeeding step during stair ascent or descent prevents accumulation of positional error and enables the robot to climb or descend any number of steps in succession.

Figure 21:
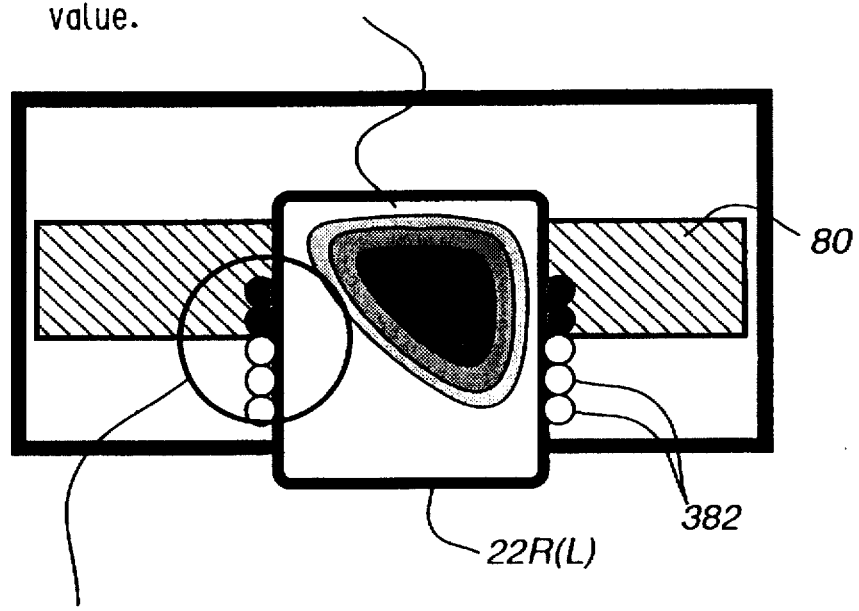
FIG. 21 is an explanatory view showing the detection of the sensor illustrated in FIG. 3 which is able to detect the relative position irrespective of how small the distributed load so long as the optical detector array is over the step.

The configuration according to the foregoing embodiment makes it possible for the robot to move stably and rapidly even on stairs or in other such environments which impose restrictions on footfall position. In addition, since, as shown in FIG. 13, the relative position can also be detected at an edgeless flat place in front of the stairs, correction can be started from the first step. Further, the relative position can be detected even if the load distribution on the bottom of the robot's foot is uneven as shown in FIG. 21. Moreover, the use of the non-contact type optical detectors 382 in the optical sensors 38 increases durability.

Figure 22:
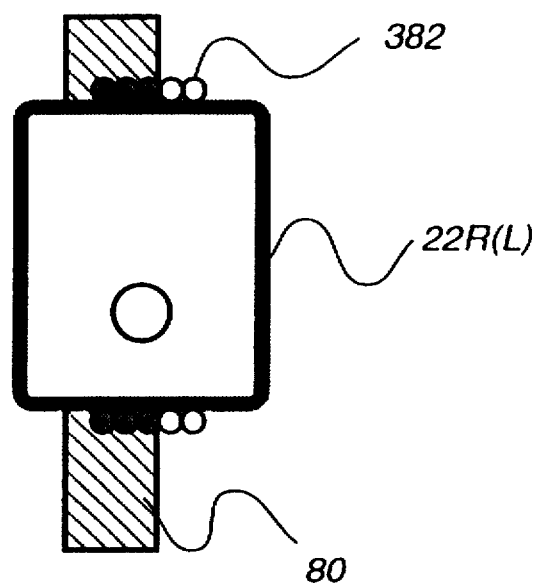
FIG. 22 is an explanatory view showing a fifth embodiment of the invention in which the optical detectors are disposed in arrays at the fore and aft edges of the robot foot member.

FIG. 22 is a schematic view of a fifth embodiment of the invention. In this embodiment the optical detectors 382 of the optical sensor 38 are disposed in arrays at the fore and aft edges of the foot member 22R(L) and the landmark 80 is provided parallel to the direction of robot advance. By the same principle as explained in the foregoing, this enables detection of angle and position in the lateral (left-right) direction. Obviously, providing optical detectors at the front, back and side edges of the foot member would make it possible for the robot to detect its position in both the fore-aft and left-right directions as well as its angle of rotation. The remainder of the configuration and the effects obtained are the same as those described earlier.

Figure 23:
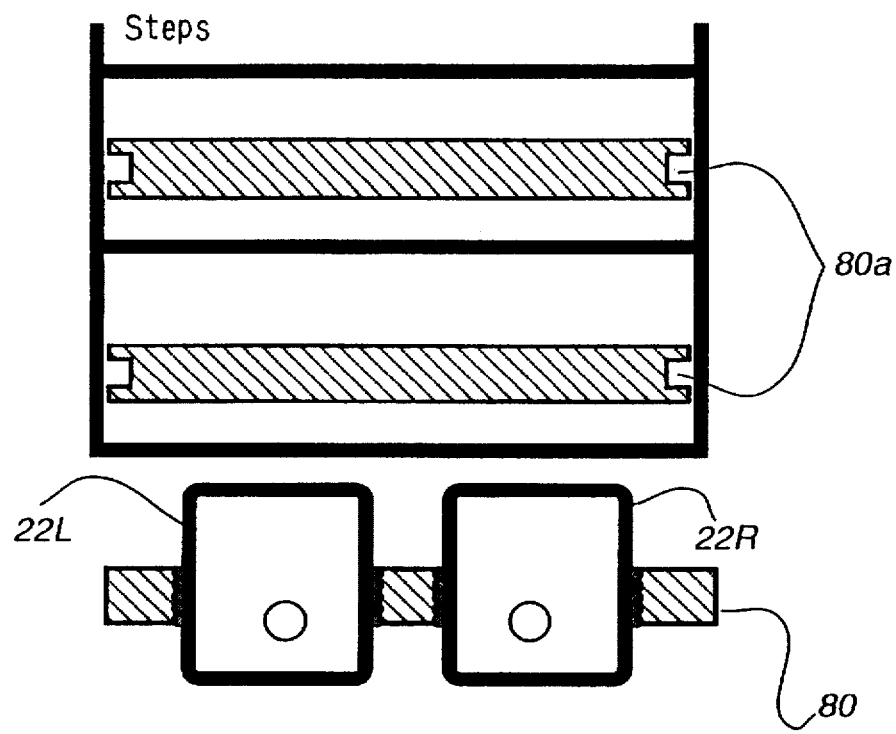
FIG. 23 is an explanatory view showing a sixth embodiment of the invention in which the ends of the landmark are formed with notches.
Figure 24:
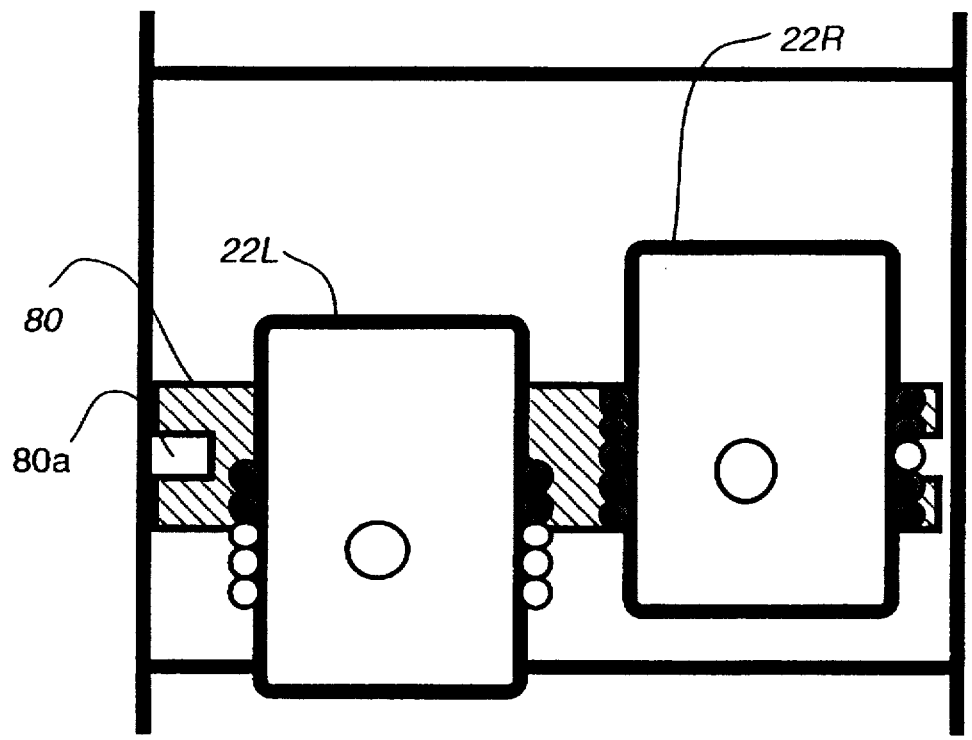
FIG. 24 is an explanatory view showing the detection according to the sixth embodiment of the invention.

FIG. 23 a schematic view of a sixth embodiment of the invention. In this embodiment, the ends of the landmark 80 near the opposite edges of each step are formed with notches 80a. Thus, as shown in FIG. 24, the notch constitutes a region with a different brightness attribute from the two regions on either side thereof in the depth direction of the step. Since the sensor output therefore differs at the notches 80a, it is possible in the illustrated case to detect that the foot member 22R is located at the right hand notch 80a. The ability to sense that a foot member is located near the left or right edge of a step makes it possible to change the footfall position on succeeding steps to a safer position nearer the step center.

Figure 25:
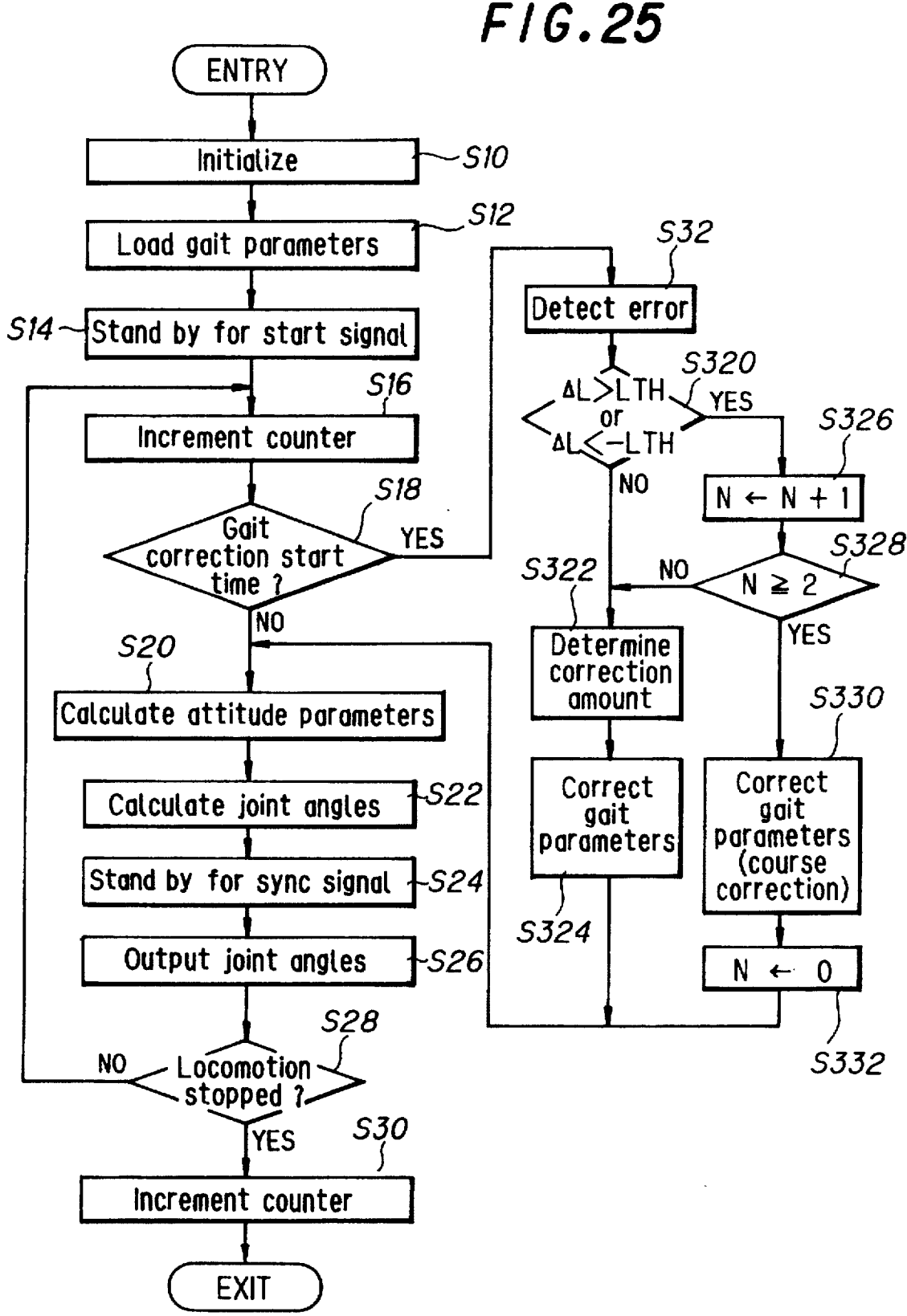
FIG. 25 is a flow chart, similar to FIG. 12, but shows a seventh embodiment of the invention.
Figure 26:
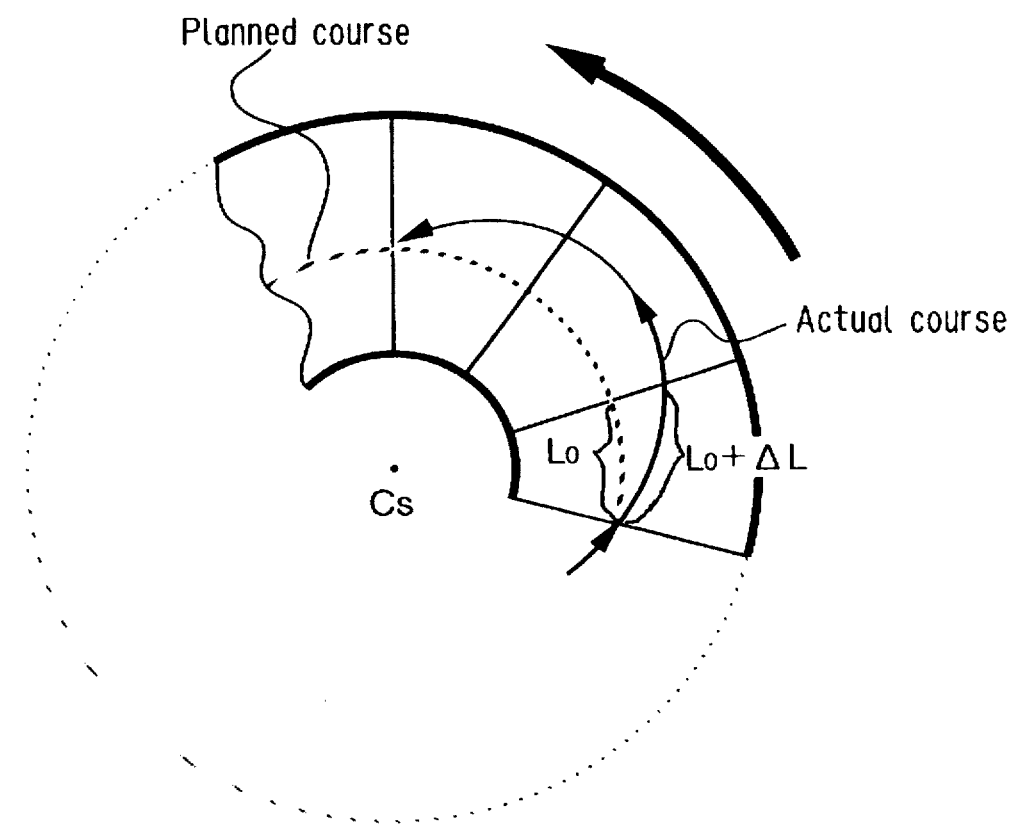
FIG. 26 is an explanatory view showing the detection according to the seventh embodiment of the invention.

FIG. 25 is a flow chart showing a control routine for ascending and descending spiral stairs according to a seventh embodiment of the invention. When, as shown in FIG. 26, a spiral staircase has a uniform curvature around its center Cs, the course traversed by a robot ascending or descending the stairs becomes longer with increasing distance from the center Cs. The seventh embodiment focuses on this point.

In the flow chart of FIG. 25, the routine starts from S10 and continues to S18, where a check is made as to whether or not it is time to start gait correction, and if it is, the error is detected in S32. Up to this point, the procedures are the same as those in the fourth embodiment.

After the error has been detected in S32, the error Delta L between the desired stride Lo (shown in FIG. 26; same as the aforementioned stride Wn) and the actual stride is compared with a prescribed value LTH. When the error Delta L is greater than the prescribed value LTH, it is highly likely that the robot has strayed from the planned course on the spiral stairs. The prescribed value LTH is therefore a basis for deciding whether or not course correction is required and is the distance expected by the planned course (indicated by the broken line in FIG. 26). If it is found in S320 that Delta L does not exceed the prescribed value LTH, the correction amount required is decided in S322 and the gait parameter (stride) is corrected in S324.

If it is found in S320 that Delta L exceeds the prescribed value, it is confirmed in S326 that the sign of Delta L is the same and the counter value is incremented, whereafter a check is made in S328 as to whether or not the counter value is 2 or greater. If it is not, S322 and the following steps are executed. If it is, it can be assumed that the actual course has deviated from the planned course as shown in FIG. 26. In this case, therefore, the course is corrected by correcting the gait parameters. The counter value is then reset in S332, whereafter S20 and the following steps are executed in the same manner as in the fourth embodiment. As in the fourth embodiment, a landmark is provided in front of the stairs.

Owing to the foregoing configuration, the seventh embodiment enables the robot to walk stably while staying on the prescribed trajectory at all times, even when ascending and descending spiral stairs.

Figure 27:
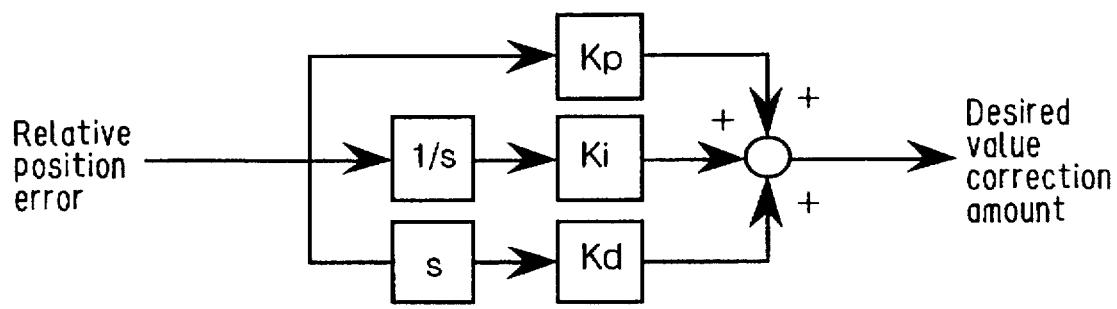
FIG. 27 is a block diagram, similar to FIG. 14, but shows an eighth embodiment of the invention.

FIG. 27 is a schematic diagram of an eighth embodiment of the invention, in which the determination of the correction amount in S34 of the flow chart of FIG. 12 is made by correcting the desired value by use of a PID rule instead of by the P control rule shown in the block diagram of FIG. 14. The remainder of the configuration is the same as that set out in the foregoing and in the fourth and seventh embodiments.

Figure 28:
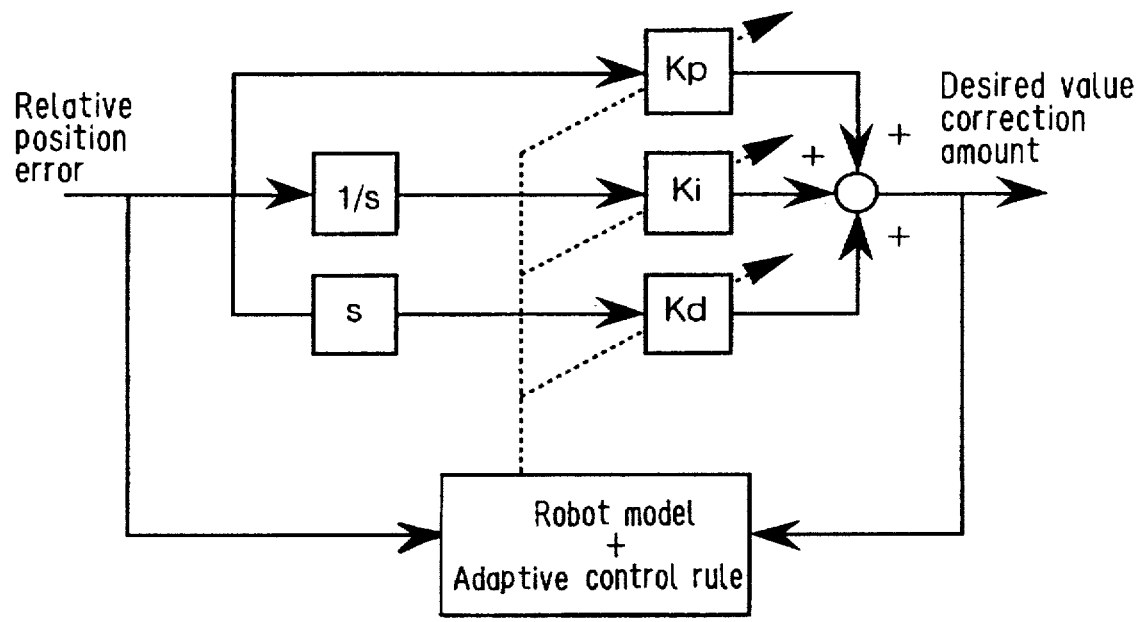
FIG. 28 is a block diagram, similar to FIG. 27, but shows a ninth embodiment of the invention.

FIG. 28 is a schematic diagram of a ninth embodiment of the invention, in which an adaptive control rule is combined with a PID rule.

Figure 29:
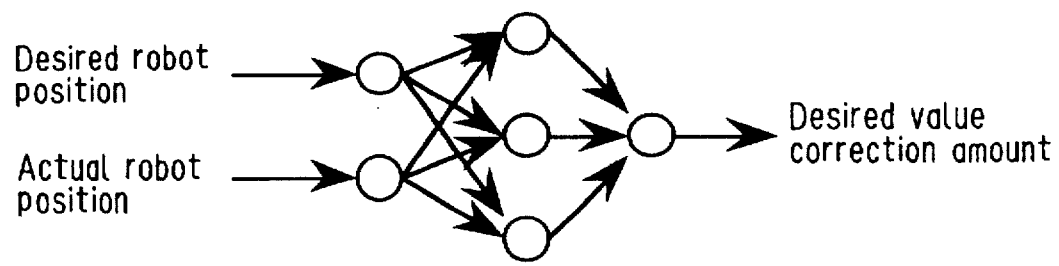
FIG. 29 is a block diagram, similar to FIG. 27, but shows a tenth embodiment of the invention.

FIG. 29 is a schematic diagram of a tenth embodiment of the invention, which uses the learning capability of a neural network for sensing slippage between the ground surface and the bottom of the robot's feet, aging changes, link bending and the like. In this case, a blind zone is established for absorbing step depth. The strengths of the coupling between the neurons at the points indicated by % are updated by BP rules.

Figure 30:
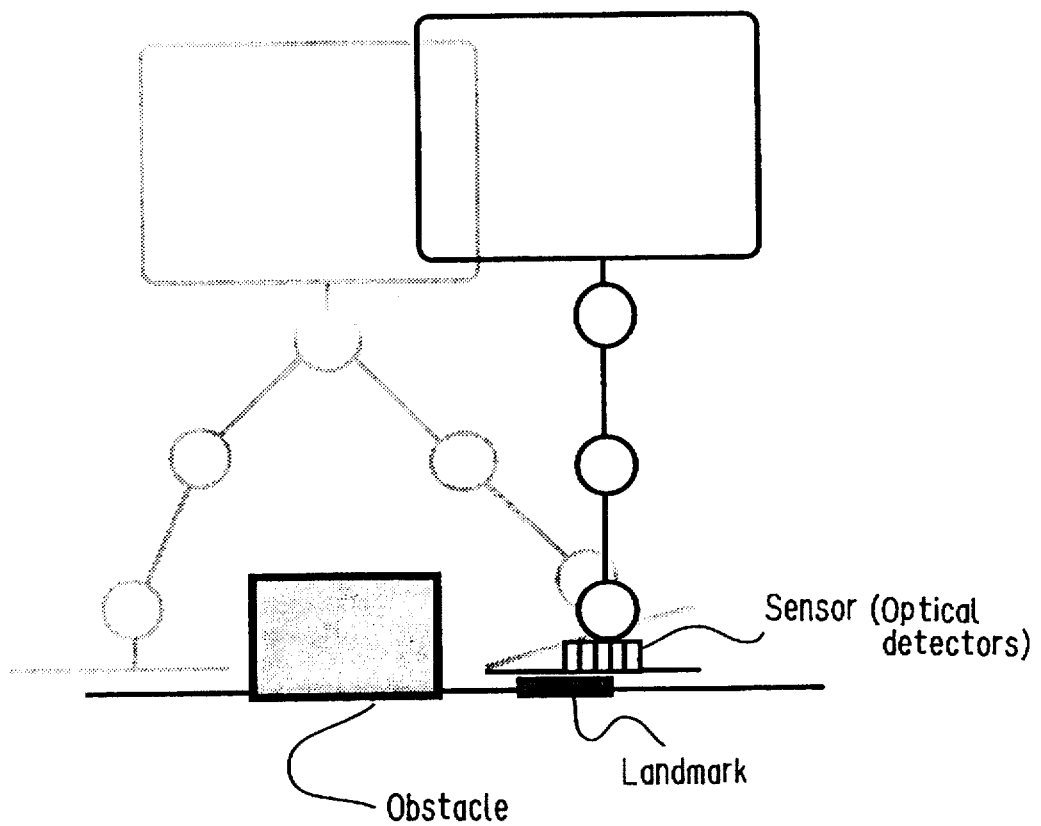
FIG. 30 is an explanatory view showing the mobile robot of FIG. 1 steps over an obstacle.
Figure 31:
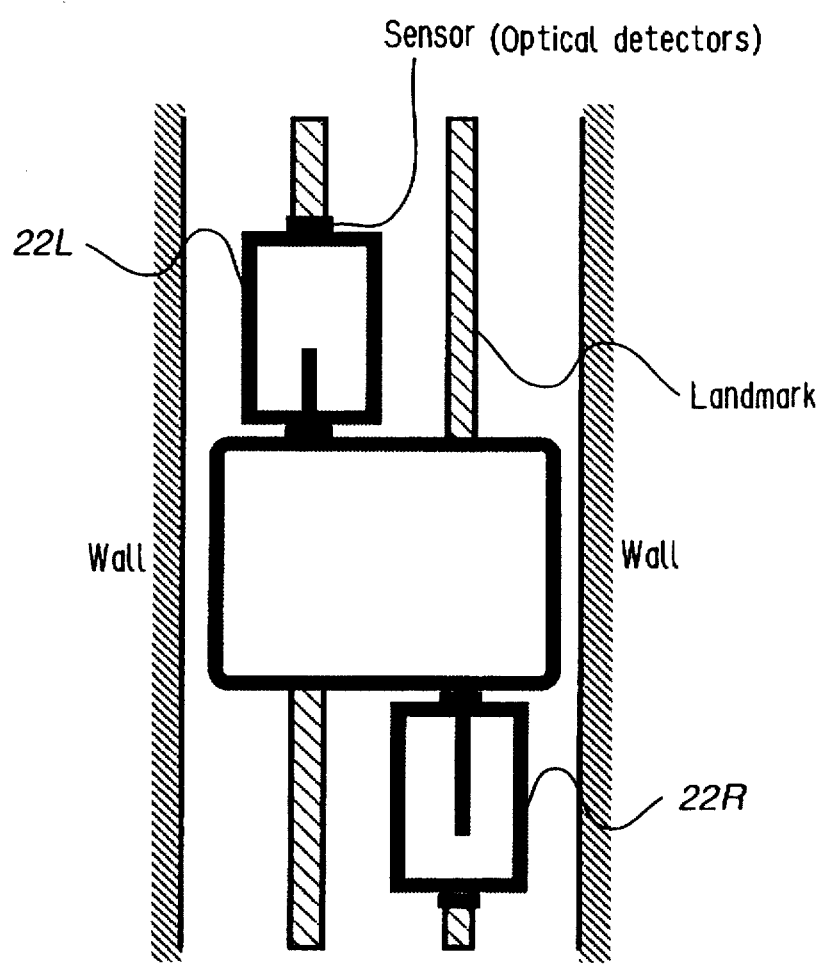
FIG. 31 is an explanatory view showing the mobile robot of FIG. 1 passing through a narrow corridor.
Figure 32:
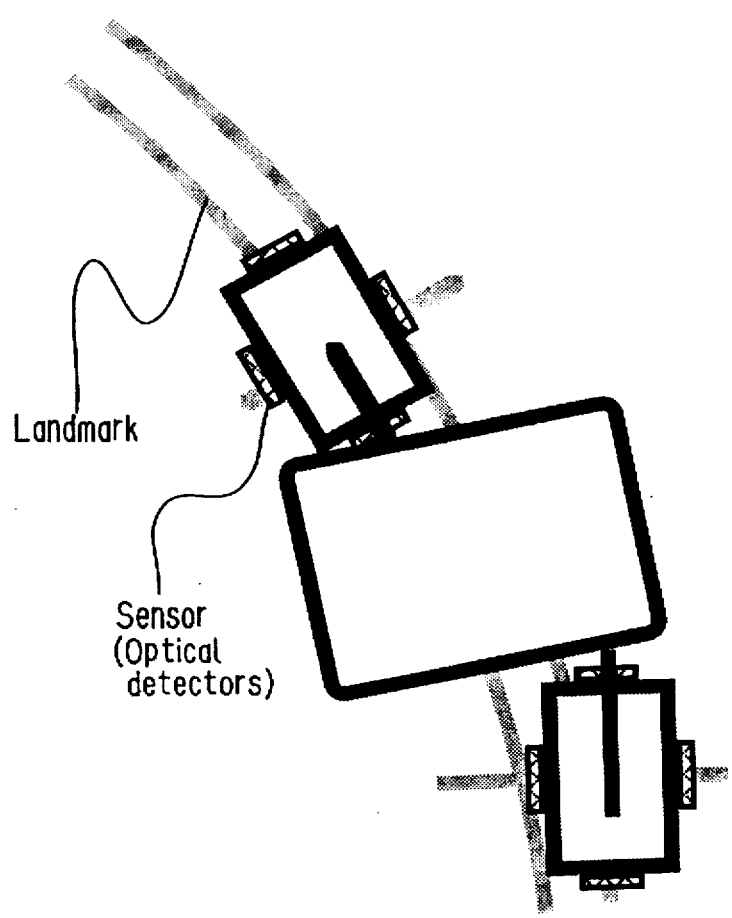
FIG. 32 is an explanatory view showing the mobile robot of FIG. 1 negotiating a corner.
Figure 33:
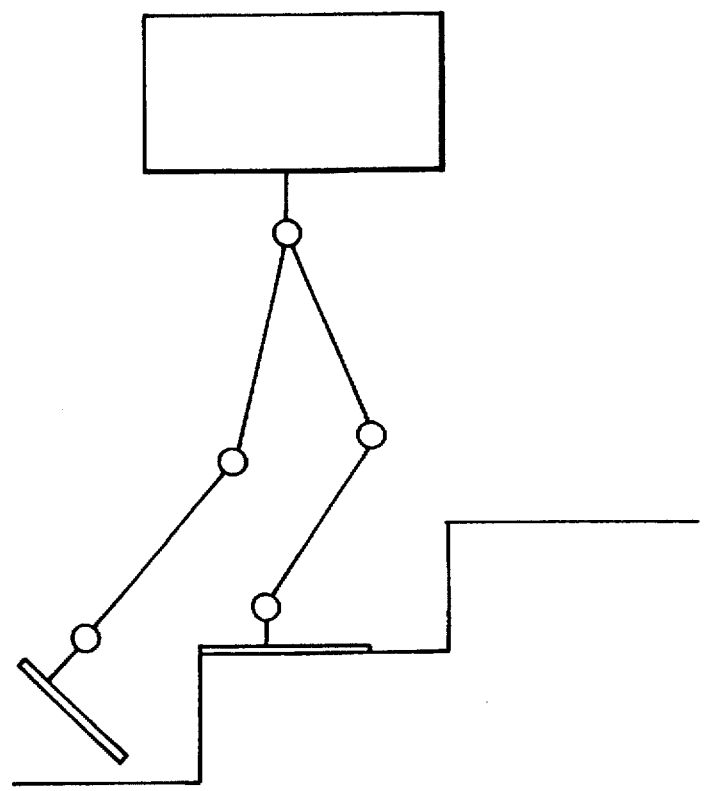
FIG. 33 is an explanatory view showing the mobile robot of FIG. 1 climbing stairs.

Since the first to tenth embodiments described in the foregoing can also detect relative position using landmarks provided on flat terrain, they can be applied not only for use on stairs but also for use at any other place where a robot is required to accurately ascertain its position. Examples include situations such as where the robot steps over an obstacle as shown in FIG. 30 (in which case the position in the fore-aft direction is critical), where the robot passes through a narrow corridor as shown in FIG. 31 (in which case position in the lateral direction is critical), and where the robot negotiates a corner as shown in FIG. 31 (in which case the fore-aft position, the lateral position and the rotational angle are all critical). These embodiments can also be widely applied to cases in which the parameters to be controlled are discrete, irrespective of whether they relate to position or angle, such as in the case of walking on cross ties or a rail or of controlling locomotion so as to reach the destination or pass intermediate points at specified times.

FIG. 30 also applies in the case where the direction of movement is to be changed at an intermediate point of the travel path, since merely providing a landmark at the turning point makes it possible to execute the turn quickly and stably. Use of this method for guiding a robot along a desired path greatly reduces the amount of painting work in comparison with the case where guide lines are applied along the full length of the course to be traveled. In addition, it enables the robot to accurately ascertain even its orientation, which could not be discerned at all with the prior art methods.

The first to tenth embodiments were explained in the foregoing with reference to legged and wheeled robots as two examples of mobile robots. These two types of robots differ in their locomotion mechanisms. The sensors (optical detectors) of the wheeled robot move continuously along the ground surface. Even if the precision of the dead reckoning is somewhat poor, therefore, the robot can nevertheless ascertain that it has reached the point concerned from the change in the output of the first sensor of the sensor array. In this sense, this invention is better suited for application to wheeled mobile robots.

On the other hand, since legged mobile robots intrinsically have discreet footfall positions owing to their principle of operation, there is always a risk that the legged robot may step over a landmark. As was explained in the foregoing, however, the probability of this happening can be substantially eliminated by using broad landmarks and/or reducing the robot's stride as it approaches a landmark. Apart from this, it is preferable to establish the fundamental gait such that the foot of the free leg stays as close as possible to the ground surface. Since legged robots are by far the best at negotiating stairs as discussed in connection with the fourth and seventh embodiments, the present invention can be applied to legged mobile robots with particularly good effect when steps (stairs) are present as part of the course of travel.

While the first to tenth embodiments were explained with respect to legged and wheeled robots, the invention can of course also be applied to crawler and other types of robots.

The present invention has thus been shown and described with reference to the specific embodiments. However, it should be noted that the present invention is in no way limited to the details of the described arrangements; changes and modifications may be made without departing from the scope of the appended claims.

What is claimed is:

1. A system for controlling locomotion of a legged mobile robot walking in a space, with the robot having a foot member having first and second sides, comprising:

detecting means for detecting at least one of position and direction of the legged mobile robot with respect to the space;

said detecting means including a plurality of non-contact detectors in an array at least at the first side of the foot member of the robot;

error determining means for determining an error between a desired value and the detected position/direction of the robot;

correcting means for correcting a gait or a desired value relative to a gait in response to the determined error; and a space divider in the space for dividing the space into at least two regions with different attributes, with said non-contact detectors generating different signals in response to the attributes of the regions.

2. The system according to claim 1 wherein said non-contact detectors are disposed in line arrays at both sides of the foot member of the robot.

3. The system according to claim 1, wherein said space divider has a depth substantially equal to that of the array of non-contact detectors.

4. The system according to claim 1 wherein the robot has front and a back, and the first side of the foot is adjacent to the front or back of the robot.

5. The system according to claim 1 wherein the robot has a left side and a right side, and the first side of the foot is adjacent to the left or right side of the robot.

6. The system according to claim 1 wherein said non-contact detectors are optical detectors.

7. The system according to claim 1 wherein the robot is a legged mobile robot having a controllable stride in a direction of advance which is controlled so as not to exceed substantially twice the dimension of the space divider in the direction of advance.

8. A system for controlling locomotion of a legged mobile robot walking in a space, comprising;

detecting means for detecting at least one of position and direction of the legged mobile robot with respect to the space;

said detecting means including a plurality of non-contact detectors on a foot member of the robot;

a space divider in the space for dividing the space into at least two regions with different attributes at least by one of a line and an arc;

said plurality of detectors generating different signals in response to the attributes of the regions; and with said detecting means receiving the signals of said plurality of detectors to detect a relative position of the mobile robot with respect to the space divider;

error determining means for determining an error between a desired value and the detected position/direction of the robot; and correcting means for correcting a gait or a desired value relative to a gait in response to the determined error.

9. The system according to claim 8 wherein said detectors are disposed at least in two line arrays on the foot member and said detecting means detects at least one of relative position and relative direction of the mobile robot with respect to the space divider.

10. The system according to claim 9 wherein said space divider includes an arc having a center of curvature, and said detecting means detects at least one of relative position and relative direction of the mobile robot with respect to the center of the arc of said space divider.

11. The system according to claim 10 wherein the center of the arc is located at a work station for the mobile robot.

12. The system according to claim 8 wherein the mobile robot moves in a direction of advance and said detectors are disposed in a line array in parallel with the direction of advance.

13. The system according to claim 12 wherein the space divider has a width D and the legged mobile robot moves with a stride controlled to be no more than about 2D.

14. The system according to claim 12 wherein the detectors are positioned in a first line array at a first side of the foot and in a second line array, on a second side of the foot, with the second line array parallel to the first line array.

15. The system according to claim 8 further comprising a camera on the robot linked to a processor having boundary map information.

16. The system according to claim 8 wherein said space divider comprises black paint or other light absorbing material.

17. The system according to claim 8 wherein the robot has two feet with a pair of parallel line arrays of detectors on each foot.

18. The system according to claim 8 wherein said detectors are optical detectors.

19. A system for controlling locomotion of a legged mobile robot having a body and a plurality of articulated legs each connected to the body through a hip joint and a foot member connected to each leg through an ankle joint, such that the robot walks contacting at least one of the foot members on a ground surface, comprising;
    an optical sensor mounted at each of the foot members for detecting reflected light from the ground surface and for generating a first signal indicative of absence/presence of reflected light;
    a sensor unit mounted on each leg of the robot;
    a first cable connecting the optical sensors with the sensor unit such that the sensor unit receives the first signal and converts it to a second signal;
    a control unit mounted on the body of the robot; and
    a second cable connecting the sensor unit with the control unit such that the control unit detects a position of a foot member and determines a command for driving the legs based at least in part on the detected position.

20. The system according to claim 19 wherein the first signal is an optical signal and the first cable is an optical fiber cable.

21. The system according to claim 20 wherein the second signal is an electric signal and the second cable is an electric cable.

22. A system for controlling locomotion of a legged mobile robot walking in a space, comprising:
    detecting means for detecting at least one of position and direction of the legged mobile robot with respect to the space;
    said detecting means including a plurality of non-contact detectors arranged in a line at one side of a foot member of the robot;
    error determining means for determining an error between a desired value and a detected position/direction of the robot;
    correcting means for correcting a gait or a desired value relative to a gait in response to the determined error;
    said legged mobile robot having means for ascending or descending a spiral staircase including:
        first means for determining a walking course desired value in terms of a stride of the robot;
        second means for detecting relative position of the robot with respect to the spiral staircase in terms of an actual stride; and
        third means for comparing the walking course desired stride with the detected actual stride and for correcting the stride in response to an error between said walking course desired stride and actual stride.

23. A system according to claim 22 wherein said third means compares an error between said walking course desired stride and the actual stride with a prescribed value and corrects the next stride in response to a result of the comparison.

24. A system for controlling movement of a legged mobile walking robot having at least a first foot member and a second foot member, with each foot member having a first side, a second side, a front and a back, comprising:
    a first array of non-contact detectors arranged in a straight line adjacent to the first side of the first foot member;
    a second array of non-contact detectors arranged in a straight line adjacent to the second side of the first foot member and spaced laterally apart from the first array;
    a third array of non-contact detectors arranged in a line adjacent to the front or back of the first foot member;
    a sensor unit on the robot linked to the first, second and third array;
    a processor on the robot linked to the sensor unit;
    wherein the robot moves in a direction of advance and the system includes a space divider having a dimension D in the direction of advance, and wherein the controller controls the robot to make a stride no more than about 2D.

25. A system for controlling movement of a legged mobile walking robot having at least a first foot member and a second foot member, with each foot member having a first side, a second side, a front and a back, comprising:
    a first array of non-contact detectors arranged in a straight line adjacent to the first side of the first foot member;
    a second array of non-contact detectors arranged in a straight line adjacent to the second side of the first foot member and spaced laterally apart from the first array, wherein the non-contact detectors are optical detectors and are positioned on the first foot member with a clear line of sight through or past the foot member to the ground surface supporting the foot member;
    a sensor unit on the robot linked to the first array and the second array; and
    a processor on the robot linked to the sensor unit.

26. A system for controlling movement of a legged mobile walking robot having at least a first foot member and a second foot member, with each foot member having a first side, a second side, a front and a back, comprising:
    a first array of non-contact detectors arranged in a straight line adjacent to the first side of the first foot member;
    a second array of non-contact detectors arranged in a straight line adjacent to the second side of the first foot member and spaced laterally apart from the first array;

a sensor unit on the robot linked to the first array and the second array;

a processor on the robot linked to the sensor unit; and a space divider on a floor surface on which the robot walks, the space divider dividing the floor surface into at least two regions detectable by the first array of non-contact sensors.

27. The system of claim 26 wherein the first array of non-contact sensors has a length substantially equal to that of the space divider.

28. The system of claim 26 wherein the detectors are optical detectors.

* * * * *